(12) United States Patent
Yao

(10) Patent No.: US 12,730,060 B2
(45) Date of Patent: Sep. 8, 2026

(54) SYSTEMS AND METHODS FOR PHOTOACOUSTIC MICROSCOPY

(71) Applicant: DUKE UNIVERSITY, Durham, NC (US)

(72) Inventor: Junjie Yao, Cary, NC (US)

(73) Assignee: Duke University, Durham, NC (US)

( * ) Notice: Subject to any disclaimer, the term of this patent is extended or adjusted under 35 U.S.C. 154(b) by 158 days.

(21) Appl. No.: 18/724,929

(22) PCT Filed: Jan. 6, 2023

(86) PCT No.: PCT/US2023/010316
§ 371 (c)(1),
(2) Date: Jun. 27, 2024

(87) PCT Pub. No.: WO2023/133273
PCT Pub. Date: Jul. 13, 2023

(65) Prior Publication Data

US 2025/0164387 A1 May 22, 2025

Related U.S. Application Data

(60) Provisional application No. 63/297,030, filed on Jan. 6, 2022.

(51) Int. Cl.
*G01N 21/17* (2006.01)
*G01N 21/19* (2006.01)
(Continued)

(52) U.S. Cl.
CPC ......... *G01N 21/1702* (2013.01); *G01N 21/19* (2013.01); *G01N 21/65* (2013.01);
(Continued)

(58) Field of Classification Search
CPC .... G01N 21/1702; G01N 21/19; G01N 21/65; G01N 29/221; G01N 29/2437; G01N 2021/655; G01N 2201/06113
See application file for complete search history.

(56) References Cited

U.S. PATENT DOCUMENTS

2017/0356884 A1 12/2017 Hu et al.
2019/0307334 A1 10/2019 Wang et al.
2020/0282424 A1 9/2020 Oralkan et al.
2021/0199566 A1 7/2021 Haji et al.

FOREIGN PATENT DOCUMENTS

CN 200989883 Y * 12/2007 ......... G01N 29/2418
CN 102664339 A * 9/2012 ............... G02F 1/35

OTHER PUBLICATIONS

Liang, Yizhi, et al., “2 MHz multi-wavelength pulsed laser for functional photoacoustic microscopy”, Optics Letters 42 (7) Apr. 1, 2017: 1452-1455.

(Continued)

*Primary Examiner* — Georgia Y Epps
*Assistant Examiner* — Don J Williams
(74) *Attorney, Agent, or Firm* — Barnes & Thornburg LLP

(57) ABSTRACT

Systems and methods for producing an ultrafast functional photoacoustic microscopy system are disclosed herein. Such systems are configured to enable the imaging of microvasculature and functional dynamics of tissue samples with a broad field of view and high spatial resolution. According to several disclosed embodiments, a combination of a Raman path and a polygon scanner in water immersion and air immersion environments enables rapid imaging of target materials.

20 Claims, 19 Drawing Sheets

(51) Int. Cl.
*G01N 21/65* (2006.01)
*G01N 29/22* (2006.01)
*G01N 29/24* (2006.01)

(52) U.S. Cl.
CPC ....... *G01N 29/221* (2013.01); *G01N 29/2437* (2013.01); *G01N 2021/655* (2013.01); *G01N 2201/06113* (2013.01)

(56) References Cited

OTHER PUBLICATIONS

Supplementary European Search Report in EP Application No. 23737629.8, dated Nov. 11, 2025, 9 pages.
PCT Search Report and Written Opinion prepared for PCT Application No. PCT/US2023/010316, completed Apr. 21, 2023.
Chen, Jiangbo, et al., "Wide-field Polygon-scanning Photoacoustic Microscopy of Oxygen Saturation at 1-MHz A-line rate," 2020, Photoacoustics 20, ): 100195, pp. 1-7.
Yao, Junjie, et al., "Multiscale Photoacoustic Tomography Using Reversibly Switchable Bacterial Phytochrome as a Near-infrared Photochromic Probe," 2016, Nature Methods, vol. 13, No. 1, pp. 67-73.
Zhu, Xiaoyi, et al. "Real-time Whole-brain Imaging of Hemodynamics and Oxygenation at Micro-vessel Resolution with Ultrafast Wide-field Photoacoustic Microscopy," 2022, Light: Science & Applications, vol. 11, No. 1, p. 138.

* cited by examiner

FIG. 9

SYSTEMS AND METHODS FOR PHOTOACOUSTIC MICROSCOPY

CROSS-REFERENCE TO RELATED APPLICATIONS

This application is a U.S. national counterpart application of International Patent Application No. PCT/US2023/010316, entitled "SYSTEMS AND METHODS FOR PHOTOACOUSTIC MICROSCOPY," filed Jan. 6, 2023, which claims benefit of priority from U.S. Provisional Patent Application No. 63/297,030, filed Jan. 6, 2022, the disclosures of both of which is are hereby incorporated by reference herein in their entireties.

DISCLOSURE OF FEDERAL FUNDING

This invention was made with government support under NS111039 awarded by the National Institutes of Health. The government has certain rights in the invention.

FIELD

The present disclosure relates to systems and methods for improving image quality and collection speed in photoacoustic microscopy systems.

BACKGROUND

Brain imaging is indispensable for neural science research, and the advancement in brain imaging technologies have enabled the scientists to address important questions and expand knowledge on brains. However, existing brain imaging technologies still have various limitations that have hindered their applications in biomedical studies. While positron emission tomography (PET) and functional magnetic resonance imaging (fMRI) can provide excellent penetration, they suffer from low spatial and temporal resolutions. Optical microscopy is widely used for studying brain functions with high resolution, but it is often hampered by slow imaging speed or poor penetration depth. Microbubble-enhanced ultrasound imaging has been used for brain research with deep penetration and high resolution, but it still lacks functional sensitivity.

Photoacoustic Microscopy ("PAM"), which detects ultrasound signals induced by optical absorption, has demonstrated increasing impact in brain studies. PAM combines aspects of optical reflectance microscopy with ultrasound techniques. Through these combined techniques, an inducing optical signal is projected into a targeted media. When these projected photons are absorbed into the targeted media, the targeted media experiences a positive change in temperature, which results in according expansion and vibration. These vibrations can then be detected through microphones, and assembled into a compiled image through processes similar to those used in modern high-resolution ultrasound systems.

This process of detecting acoustic signals generated by optical absorption through PAM has gained traction in the field of brain imaging over recent years. PAM techniques are capable of functional and molecular imaging with various endogenous and exogenous contrasts, and are accordingly able to measure blood oxygenation, blood flow, and metabolic rate of oxygen in living tissues. Like other scanning-based imaging technologies, it remains a technical challenge for PAM to achieve high imaging speed, large field of view (FOV), high spatial resolution, and high detection sensitivity simultaneously, which can be crucial for capturing the rapid functional responses in the brain.

Accordingly, there is a need for improvements in systems and methods for photoacoustic microscopy that provide for higher quality resolution, expanded FOV, and faster imaging speed.

SUMMARY

The Summary is provided to introduce a selection of concepts that are further described below in the Detailed Description. This Summary is not intended to identify key or essential features of the claimed subject matter, nor is it intended to be used as an aid in limiting the scope of the claimed subject matter.

The disclosure herein pertains to systems and methods for improving image quality and temporal density in applications of photoacoustic microscopy. More particularly, by utilizing a combination of a Raman laser and a polygon scanner, excitation light in a photoacoustic system can be dispersed with increased precision across shorter impulses. An operator of the system can more finely tune how to disperse excitation energy into a target, such as living tissues. As the location and amount of energy dispersed into the tissues over time is more finely controllable by these systems and methods, the acoustic output of the target media allows for higher resolution ultrasound images to be captured in shorter periods of time than utilizing systems currently known in the art.

The example embodiments disclosed herein relate to the improvement in resolution, FOV, and imaging speed for photoacoustic microscopy systems. In at least one example embodiment, a photoacoustic microscopy system includes a first dichroic reflecting surface, a second dichroic reflecting surface, a Raman path, and a scanner assembly. The Raman path is in optical communication with each of the first and second dichroic reflecting surfaces and the scanner assembly is in optical communication with the second dichroic reflecting surface. The Raman path includes a Raman shifter and an optical delay line. The Raman shifter is configured to receive a first portion of a laser from the first dichroic reflecting surface and shift a wavelength of the first portion, while the optical delay line is configured to receive a second portion of the laser from the first dichroic reflecting surface and delay the second portion from being received by the second dichroic reflecting surface. The optical communication between the scanner assembly and the second dichroic reflecting surface is such that the scanner assembly receives both the first portion of the laser and the second portion of the laser from the second dichroic reflecting surface. Further, the scanner assembly includes a polygon scanner. The polygon scanner is configured to direct the received first and second portions to a target site.

In at least some embodiments, the system further includes a seed laser. The seed laser can be configure to operate at at least about 2 MHz. Alternatively, or additionally, the system can include an objective assembly. The objective assembly can include an objective lens.

The scanner assembly can include an ultrasound transducer. In at least some such embodiments, the scanner assembly can also include a multimode optical fiber. The ultrasound transducer can be spherically-focused, or it can be substantially flat. The ultrasound transducer can include a piezoelectric layer, a matching layer, and a housing.

In at least some embodiments the system can include a water tank and an optically-transparent ultrasound transducer mounted above the water tank. In at least some such embodiments, an imaging plane of the photoacoustic microscopy system can be disposed within the water tank. The scanner assembly can include a cylindrically-focused ultrasound transducer.

The scanner assembly can be water-immersible. In at least some such instances, the scanner assembly can include an optical-acoustic beam combiner, a rhomboid prism, and a right-angled prism. Alternatively, the scanner assembly can be air-operated.

Another embodiment of a photoacoustic microscopy system includes a Raman path and a scanner assembly. The Raman path includes a Raman shifter and an optical delay line, with the Raman shifter being configured to receive a first portion of a laser and shift a wavelength of the first portion and the optical delay line being configured to receive a second portion of the laser and delay the second portion from being received at a location at which the first portion is received after its wavelength has been shifted. The scanner assembly is in optical communication with the Raman path such that the scanner assembly receives the first and second portions of the laser. Further, the scanner assembly includes a polygon scanner immersed in fluid.

The scanner assembly can include an acoustic lens. In at least some such embodiments, the acoustic lens can be positioned between an optical-acoustic beam combiner and the polygon scanner. Still further, the assembly can include a prism. The prism can be permeable to sound and reflective to light, and the prism can be configured to project the laser through the Raman path. In at least some embodiments, a photoacoustic imaging plane can be an arc.

Still another embodiment of a photoacoustic microscopy system includes a Raman path and a scanner assembly. In this instance, the Raman path again includes a Raman shifter and an optical delay line. The Raman shifter is configured to receive a first portion of a laser and shift a wavelength of the first portion. The optical delay line is configured to receive a second portion of the laser and delay the second portion from being received at a location at which the first portion is received after its wavelength has been shifted. Similar to other embodiments, the scanner assembly is in optical communication with the Raman path such that the scanner assembly receives the first and second portions of the laser. In this embodiment, the scanner assembly includes a cylindrically-focused ultrasound transducer and an air-operated polygon scanner. The air-operated polygon scanner is configured to focus an excitation light along a focal line of the cylindrically-focused ultrasound transducer. Further, the cylindrically-focused ultrasound transducer is mounted within a water tank, between an imaging plane of the photoacoustic microscopy system and the air-operated polygon scanner.

In at least some embodiments, the imaging plane can be substantially flat.

Individuals will appreciate the scope of the disclosure and realize additional aspects thereof after reading the following detailed description of the examples in association with the accompanying drawing figures. Any of the features or variations described herein can be applied to any particular aspect or embodiment of the present disclosure in a number of different combinations. The absence of explicit recitation of any particular combination is due solely to avoiding unnecessary length or repetition.

BRIEF DESCRIPTION OF DRAWINGS

The accompanying figures incorporated in and forming a part of this specification illustrate several aspects of the disclosure and, together with the description, serve to illustrate at least some principles of the disclosure:

FIG. 9 is a graph illustrating a sample acoustic pressure field generated using methods disclosed herein;

DETAILED DESCRIPTION

Figure 1:
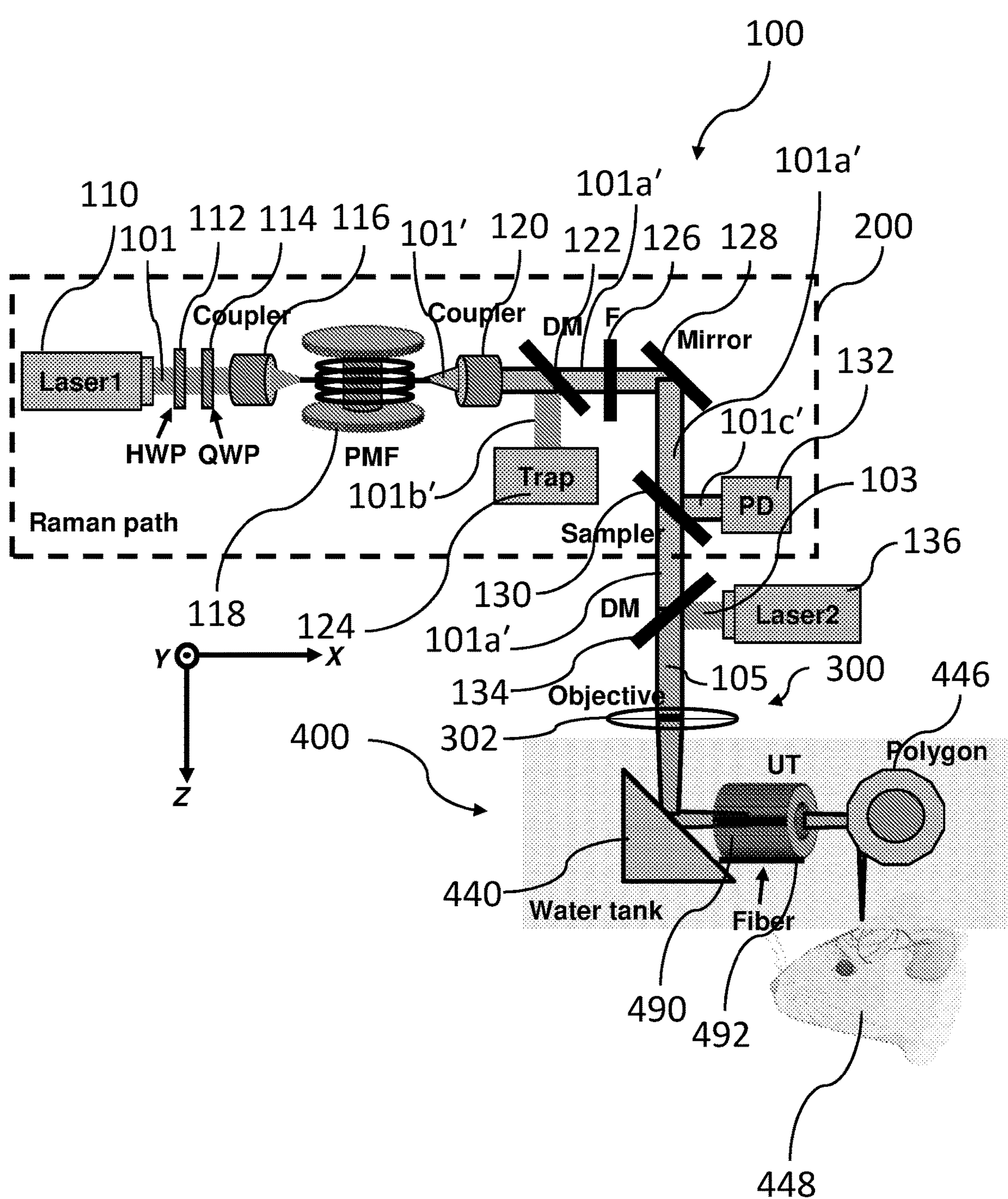
FIG. 1 is a schematic side view of a PAM system according to at least one embodiment.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. By way of non-limiting example, a person skilled in the art, in view of the present disclosure, will be able to use and/or adapt components such as lens, filters, couplers, wave plates, combiners, transducers, scanners, objectives, and various types of mirrors, among other components, that may be provided for in one illustrated embodiment to other embodiments disclosed herein or otherwise derivable from the present disclosures.

Additionally, in the present disclosure, like-numbered components of various embodiments generally have similar features when those components are of a similar nature and/or serve a similar purpose. Terms commonly known to those skilled in the art may be used interchangeably herein. For example, in at least some instances the terms light and laser may be used interchangeably, with a person skilled in the art being able to understand instances where a distinction between the two terms may be appropriate.

Articles "a" and "an" are used herein to refer to one or to more than one (i.e. at least one) of the grammatical object of the article. By way of example, "an element" means at least one element and can include more than one element. "About" is used to provide flexibility to a numerical range endpoint by providing that a given value may be "slightly above" or "slightly below" the endpoint without affecting the desired result. The use herein of the terms "including," "comprising," or "having," and variations thereof, is meant to encompass the elements listed thereafter and equivalents thereof as well as additional elements. As used herein, "and/or" refers to and encompasses any and all possible combinations of one or more of the associated listed items, as well as the lack of combinations where interpreted in the alternative ("or").

Moreover, the present disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination. Similarly, to the extent features or actions are described herein as being a "first feature" or "first action," or a "second feature" or "second action," such numerical ordering is generally arbitrary, and thus such numbering can be interchangeable. Still further, a person skilled in the art will appreciate that not all of the method steps or actions disclosed herein are required, and, in view of the present disclosure, will understand how modifications can be made to each step, the order of the steps, the limitation of certain steps, etc. without departing from the spirit of the present disclosure while still achieving the desired goals.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as approximately in the range of about 1% to about 50%, it is intended that values such as approximately in the range of about 2% to about 40%, approximately in the range of about 10% to about 30%, or approximately in the range of about 1% to about 3%, etc., are expressly enumerated in this specification. These are only examples of what is specifically intended, and all possible combinations of numerical values between and including the lowest value and the highest value enumerated are to be considered to be expressly stated in this disclosure, as are values slightly above and/or slightly below those ranges at least in instances in which the term "about" is used. A number of terms may be used throughout the disclosure interchangeably but will be understood by a person skilled in the art. By way of non-limiting example, the terms "subject" and "patient" are used interchangeably herein and refer to both human and nonhuman animals. In some embodiments, the subject comprises a human who is undergoing a medical procedure using a system or method as prescribed herein. Unless otherwise defined, all technical terms used herein have the same meaning as commonly understood by one of ordinary skill in the art to which this disclosure belongs.

Because a person skilled in the art will generally understand how PAM systems known in the art work, the present disclosure does not provide all details related to the same. A person skilled in the art will understand how to apply the principles, techniques, components, and the like disclosed herein to existing PAM systems, whether in the form of replacing certain components and/or methods of operation or designing new PAM systems based on a combination of known PAM systems and the disclosures provided for herein, without undue experimentation.

While traditional PAM systems use slow motor scanning, recent advances in high-speed PAM have explored faster scanning mechanisms, including galvo scanners, water-immersible microelectromechanical systems (MEMS) scanners, and polygon scanning systems. Among them, the polygon scanner can provide repeated line scanning over a large scanning range with simple rotary driving. The polygon scanner is advantageous over the galvo scanner and MEMS scanner, at least in part, because its scanning range does not depend on the scanning frequency. While some implementations of a high-speed PAM system based on a 6-facet polygon scanner have achieved a 900 Hz line scanning rate over a 12-mm scanning range, which is a thousand times faster than traditional motor-based PAM systems, prior to the present disclosure, polygon PAM systems were not capable of functional brain imaging with a single-wavelength excitation. Accordingly, prior to the present disclosure, polygon scanners were not implemented for use in photoacoustic imaging. Moreover, because of the limited laser pulse repletion rate, the image quality was compromised due, at least in part, to undersampling at high imaging speed. The present disclosure provides for systems and methods that operate polygon scanners in a manner that allows them to be used in photoacoustic imaging and/or makes modifications to polygon scanners that enable them for use in photoacoustic imaging. This is achieved at least due to the use of high power (e.g., up to about 2 MHz) with Raman shifting utilized with a multi-mode fiber.

The present disclosure provides for, amongst other things, an ultrafast functional photoacoustic microscopy (UFF-PAM), which enables the imaging of microvasculature and/or functional dynamics in response to physiological and/or pathophysiological challenges, with a wide FOV and high spatial resolution. An example system according to at least one embodiment includes a diamond-ground metal polygon with 12 facets, driven by a water-immersible high-speed DC motor, which can steer the confocal beam of laser excitation and ultrasound detection simultaneously. The maximum line scanning rate of such an embodiment is more than 2 kHz over an 11 mm scanning range, which is more than two times faster than previously reported polygon PAM systems. At least one embodiment of a disclosed system also comprises a simulated Raman shifter to provide dual-wavelength excitation at 532 nm and 558 nm (these wavelength values are not limiting), enabling functional brain imaging at high speed. In other or the same embodiments, an automatic image registration method addresses the possibility of misalignment of the polygon facets. Polygon scanners having a different number of facets, and different sized and shaped facets, is also possible, including but not limited to 6 facets, 24 facets, and 48 facets. Additional details with regard to the use of polygon scanners are discussed below with respect to at least FIGS. 4-6, 11, 14, and 15.

FIG. 1 provides a schematic diagram of a PAM system 100. The PAM system 100 comprises a Raman path 200, also referred to as a Raman shifter in the present application, an objective assembly 300, and a scanner assembly 400. As shown in this embodiment, the Raman path 200 includes a laser 110 that directs light, illustrated as a light beam 101, to a half wave plate 112 and then a quarter wave plate 114. The light beam 101 can have a wavelength of 532 nm, which a person skilled in the art will appreciate is a typical wavelength for a laser. The plates 112, 114 can both aid in changing a polarization of the light beam 101, in turn improving the efficiency of the Raman shifter 200. The light beam 101 then passes through a coupler, in this instance an objective, 116, which can focus the light as it moves further along the Raman path 200. Subsequently, a polarization maintaining fiber (PMF) 118 can help shift the wavelength of the light beam 101. For example, the wavelength can be shifted from 532 nm to a higher wavelength, such as 558 nm. The light beam having a higher wavelength is represented in FIG. 1 by reference numeral 101'. A coupler, in this instance an achromatic fiber port, 120 can be used to collimate the output from the PMF 118, the light beam 101'. That resulted collimated output can then be directed to a dichroic mirror 122, which can also more generally be referred to as a dichroic reflecting surface, splitting the beam 101' into two beams 101*a*', 101*b*'. As shown, a portion of the beam, shown as light beam 101*b*', can be directed to a trap 124, and the remaining portion, shown as light beam 101*a*', can pass towards a filter 126. More particularly, the dichroic mirror 122 can be configured to help direct light that was not shifted to the desired wavelength, the light beam 101*a*', towards the trap 124 to help filter that light out. That light may have a wavelength of 532 nm still. The light not filtered out to the trap 124, the light beam 101*b*', can pass through the filter 126, which can serve as a further source for purifying the light to the desired wavelength. For example, the filter 126 can be configured to further eliminate light having a wavelength of 532 nm that made it through the dichroic mirror 122.

The light beam 101*a*' can then travel from the filter 126, to a mirror 128, and into a sampler 130. The sampler 130 can be used to reflect a portion of the light, often a small portion, illustrated as light beam 101*c*', to a photodiode 132, for analysis. The photodiode 132 can, for example, confirm that the energy of the laser is consistent and stable. The non-sampled light, still illustrated as light beam 101*a*', can then be directed to another dichroic mirror 134, with this mirror being configured to combine that light beam 101*a*', plus light from a second laser 136, illustrated as a light beam 103, towards the objective assembly 300. The light from the second laser 136 can be light of a different wavelength, such as the typical 532 nm wavelength of a laser. Even though the Raman shifter 200, as described, can include a number of features to filter out certain wavelengths, like 532 nm, the use of the two light beams of differing wavelengths for scanning by a scanner assembly 400 is still helpful. By providing for these two different wavelengths, with the Raman shifted wavelength being filtered of as much of the normal laser wavelength, it enables better control of each light stream independently. The desired pulse energy and timing of the lasers can be more precise, among other benefits provided for herein or otherwise known to those skilled in the art in view of the present disclosures.

The combination of light beams 101*a*' and 103 from the dichroic mirror 134 can be focused, as shown, at an objective or objective lens 302 of the objective assembly 300. The resulting, focused beam, illustrated as light beam 105, can then be directed into a scanner assembly 400. As shown, the scanner assembly 400 can include a water tank 440, an ultrasound transducer 490, and an optical fiber 492, with the light beam 105 passing therethrough, being directed to at polygon scanner 446, and ultimately into a target 448, as shown a mouse. Further details about how various components of the Raman path 200, the objective assembly 300, and the scanner assembly 400 are described below, often times with reference to other figures with similar components and/or are otherwise understood by a person skilled in the art. That is, a person skilled in the art, in view of the present disclosures, will understand how these teachings relate and thus how the various features of the PAM system 100 operate in view of the disclosures herein and knowledge of a person skilled in the art. Further, in conjunction with the present disclosures, the traveling of light or light beams is described. A person skilled in the art will appreciate that, as illustrated, various components provided for herein are in optical communication with each other, such as the Raman path 200 and the scanner assembly 400 being in optical communication with various reflecting surfaces, such as the dichroic mirror 134 and the objective assembly 300. To the extent the present disclosure describes or illustrates light or light beams being passed from one component to another, those components are considered to be in optical communication, including being in optical communication with other components further up or downstream in the figures.

Figure 2:
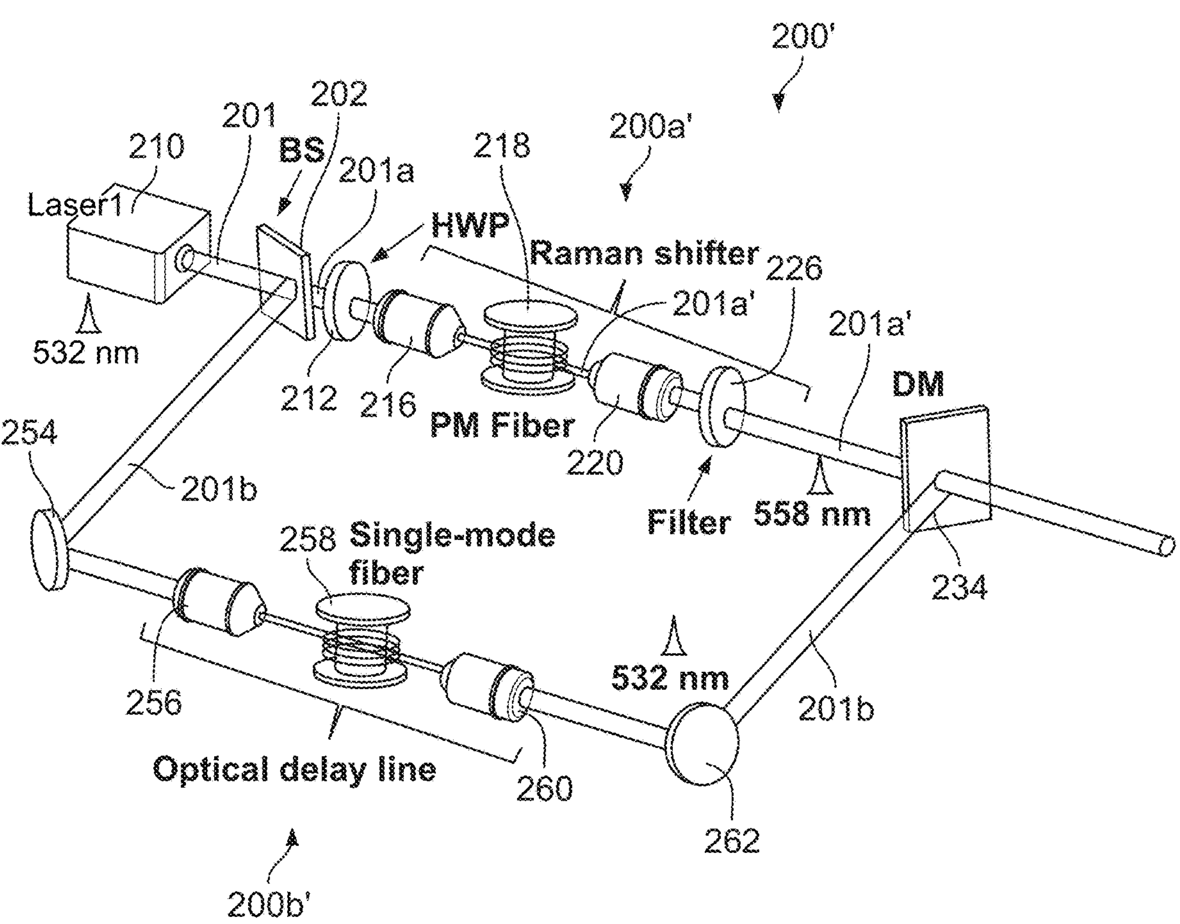
FIG. 2 is a schematic perspective view of a Raman path of a PAM system that includes a high-speed Raman-shifted laser and an optical delay line.

A sample Raman path 200' for use in PAM systems, like the system 100, is shown schematically in FIG. 2. In the embodiment illustrated in FIG. 2, rather than provide for two different seed lasers (e.g., laser 110 and laser 136 in FIG. 1) to eventually be fed into an objective assembly and a scanner assembly, the configuration of the Raman path 200' is such that a beam of light from a single seed or pump laser 210 is split, allowing a portion of the light to be shifted and the other portion to be delayed and eventually combined at a dichroic mirror 234, similar to the dichroic mirror 134.

According to the embodiment shown in FIG. 2, a high-speed seed laser 210 (e.g., model SPFL-532-40 from Spectral-Physics) can be used for building a dual-wavelength Raman-shifter based excitation. The seed laser 210 can fire at about 2 MHz pulse repetition rate at about 532 nm in the illustrated embodiment, which can lead to a high pulse repetition rate in photoacoustic imaging. In the Raman path 200' of the illustrated embodiment, a first beam path 200*a*' can deliver a 558 nm light beam, illustrated as light beam 201*a*', by way of a Raman shifter (alternatively referred to as the first beam path 200*a*' and/or the Raman path 200*a*' herein), for example beginning with a first dichroic mirror 202, which can more generally be a dichroic reflecting surface. In the illustrated embodiment, the dichroic mirror 202 is depicted by a beam splitter (e.g., BSW27, Thorlabs) that splits approximately half of the initial light beam 201 from the pump laser 210 to the Raman path 200*a*', shown as light beam 201*a*, and the other half to an optical delay line 200*b*', shown as light beam 201*b*. The first beam path 200*a*', or alternatively referred to as a Raman shifter, can further include a half-wave plate 212 (e.g., AHWP05M-580, Thorlabs) that can adjust the polarization state of the Raman pump beam to achieve a high Raman shift efficiency. In alternative embodiments, other wave plates can be provided, such as a quarter-wave plate, similar to the quarter-wave plate 114 of the PAM system 100. The first beam path 200*a*' can also include an objective or coupler 216 (e.g., UPLFLN 20x, Olympus) that can focus the pump light into a single-mode polarization maintaining fiber (PMF) 218 (e.g., a 6.5-meter-long polarization maintaining fiber (HB450-SC, FIBERCORE) that shifts light from, for example as shown, 532 nm to 558 nm, similar to the objective 116 and PMF 118 of the PAM system 100. The resulting light beam having the different wavelength is illustrated as light beam 201*a*'. The path 200*a*' can further include an achromatic fiber port or coupler 220 (e.g., PAF2A-A10A, Thorlabs) that can collimate the fiber output similar to the port 120 of the PAM system 100. A filter 226 that can help remove the remaining pump light (e.g., an emission filter such as MF559-34, Thorlabs) can be provided. Although not illustrated, components like the dichroic mirror 122 and the trap 124 can also be used to help filter the light beam 201*a*', among other filtering components known to those skilled in the art. The resulting, filtered light beam 201*a*' can then pass to a second dichroic mirror 234 (e.g., model DMSP550 from Thorlabs), which can also more generally be a dichroic reflecting surface. In the illustrated embodiment, the Raman shifter 200*a*' shifts a wavelength of the laser 201*a* from 532 nm to 558 nm. The conversion efficiency of the Raman path is about 33% at a wavelength of about 558 nm in the illustrated embodiment. A person skilled in the art will appreciate other components and configurations that can be used in the Raman shifter 200*a*', i.e., along this path, to achieve similar results of a light beam having a shifted wavelength without departing from the spirit of the present disclosure. This may include fewer or more mirrors, couplers, filters, and/or fibers, among other features.

The dichroic mirror 202 initiates a second beam path 200*b*', also referred to as an optical delay line, along which the light beam 201*b* passes. As shown, this path 200*b*' maintains the wavelength 532 nm across it, although it is possible that in other embodiments the wavelength along this path could be shifted, likely to a wavelength different than the resulting light beam 201*a*'. The optical delay line 200*b*' keeps the wavelength of the beam 201*b* at 532 nm, but delays its transmission before reaching the second dichroic mirror 234. As shown, the beam 201*b* resulting from the split at the mirror 202 can be reflected by a mirror, or other reflecting surface, 254 and to a coupler, as shown an objective, 256, which, similar to the objectives 116 and 216, can focus the light and direct it to a fiber. In the illustrated embodiment, the light beam 201*b* is focused and directed to a single-mode fiber 258, which outputs the light beam 201*b* at the same wavelength and towards a coupler, as shown an achromatic fiber port, 260 that can collimate the fiber output, similar to the couplers 120 and 220. Another mirror or reflecting surface 262 can be provided to direct the light beam 201*b* to the dichroic mirror 234, where the two beams 201*a*' and 201*b*, can be combined, similar to the beams 101*a*' and 103 in the PAM system 100. That is, the beam 201*b* can be akin to the beam 103 except the beam 201*b* is not generated from a separate laser, but instead the same laser as the beam with which it is combined, i.e., the beam 201*a*'. A person skilled in the art will appreciate other components and configurations that can be used in the optical delay line 200*b*', i.e., along this path, to achieve similar results of moving a light beam for eventual use in a scan, without departing from the spirit of the present disclosure. This may include fewer or more mirrors, couplers, filters, and/or fibers, among other features.

Figure 3:
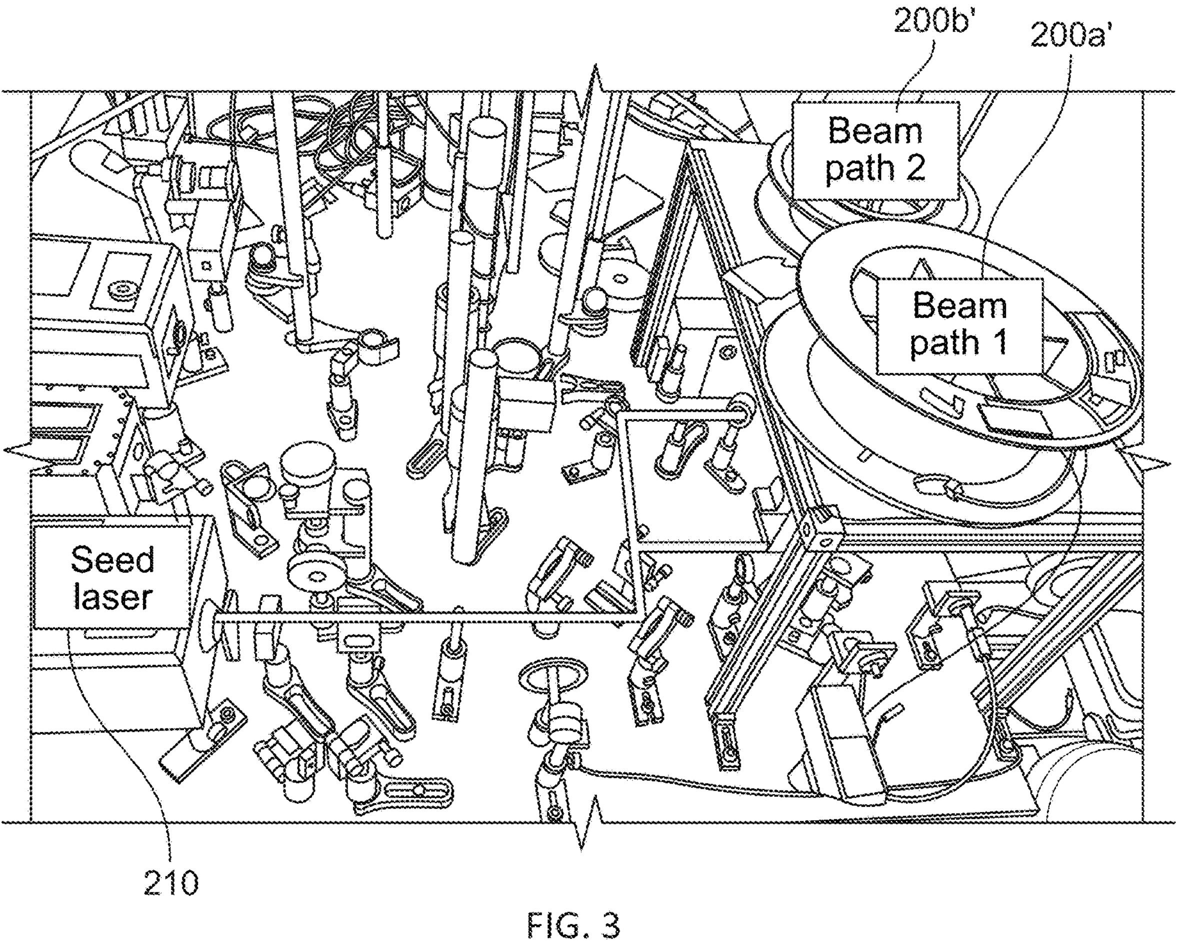
FIG. 3 is a perspective top view of an implementation of the high-speed Raman-shifted laser of FIG. 2.

The dichroic mirror 234 combines the 532 nm beam, the beam 201*b*, and the 558 nm beam, the beam 201*a*', before the light is focused by a later objective lens, such as the objective 302 of the objective assembly 300 in the PAM system 100. Through the system shown in this embodiment, both light beams 201*a*' and 201*b* at about 558 nm and about 532 nm, respectively, can operate at about 2 MHz pulse repetition rate, which gives a fast dual-wavelength light source for photoacoustic imaging in comparison to known systems and methods. According to at least some embodiments, a Raman laser shifter such as the path 200*a*' is optically pumped at 532 nm. The pump photons at 532 nm can be absorbed by a fiber medium (silica) and re-emitted as lower-frequency laser-light photons ("Stokes" photons) by stimulated Raman scattering. The difference between the two photon energies can be fixed and correspond to a vibrational frequency of the gain medium. In at least some embodiments, the maximum Raman scattering efficiency of the single-mode fiber made of silica can occur at a frequency shift of about 13.2 THz, corresponding to 545 nm for the first stoke and 558 nm for the second stoke when pumped at 532 nm. 558 nm light can be chosen for PAM because of the larger difference in the optical absorption between oxy- and deoxy-hemoglobin. A protocol implementation of the Raman-shifter laser is shown in FIG. 3, which shows an embodiment having the seed laser 210 with the first beam path 200*a*' that serves as the Raman shifter and the second beam path 200*b*' that serves as the optical delay line.

The seed laser 210 can be operated to produce lasers having a variety of wavelengths. By way of non-limiting example, the seed laser 210 can be a single seed laser able to produce multiple channels via optical fibers with different lengths that support stimulated Raman scattering. Such lengths can include, by way of non-limiting examples, 532 nm (violet light), 547 nm (darker blue light), 558 nm (lighter blue light), 570 nm (green light), 590 nm (yellow light), and/or 680 nm (red light), as well as other wavelengths at least between that range, and also below and/or above that range as desired and appropriate as understood by a person skilled in the art in view of the present disclosures.

Alternatively, or additionally, multiple seed lasers can be provided. Each laser can configured to produce an individual wavelength and/or be configured to provide a range of wavelengths. By way of non-limiting example, there can be one laser per desired wavelength, so in view of the non-limiting examples described in the previous paragraph, there can be one laser per each identified wavelength: 532 nm (violet light), 547 nm (darker blue light), 558 nm (lighter blue light), 570 nm (green light), 590 nm (yellow light), and/or 680 nm (red light).

Turning back to FIG. 1, the combined 532 and 558 nm beams, shown as the beam 105, can be sent to an objective assembly 300. The objective lens 302 (e.g., AC127-050-A, Thorlabs) focuses the combined laser beams to a diffraction-limited light spot on the sample surface, which can excite the ultrasound waves. The focused light spot often has a diameter of less than 10 μm. The objective assembly 300 directs the output to the scanner assembly 400. The objective assembly 300, or other variations thereof, can be operated with the configuration provided for in FIG. 2 as well.

Figure 4:
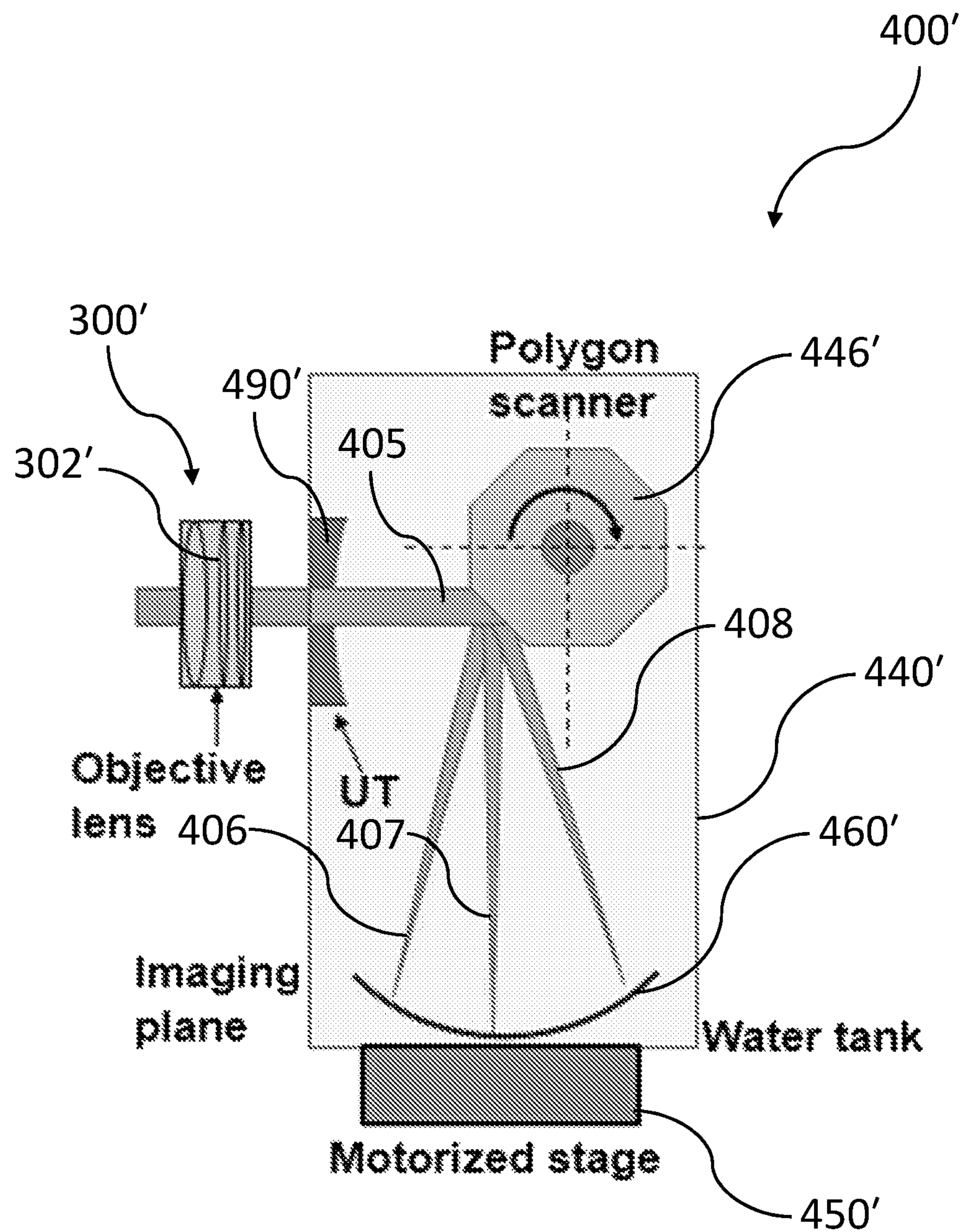
FIG. 4 is a schematic side view of a component of a PAM system comprising a water-immersible polygon scanner with a spherically focused ultrasound transducer.
Figures 5A, 5B:
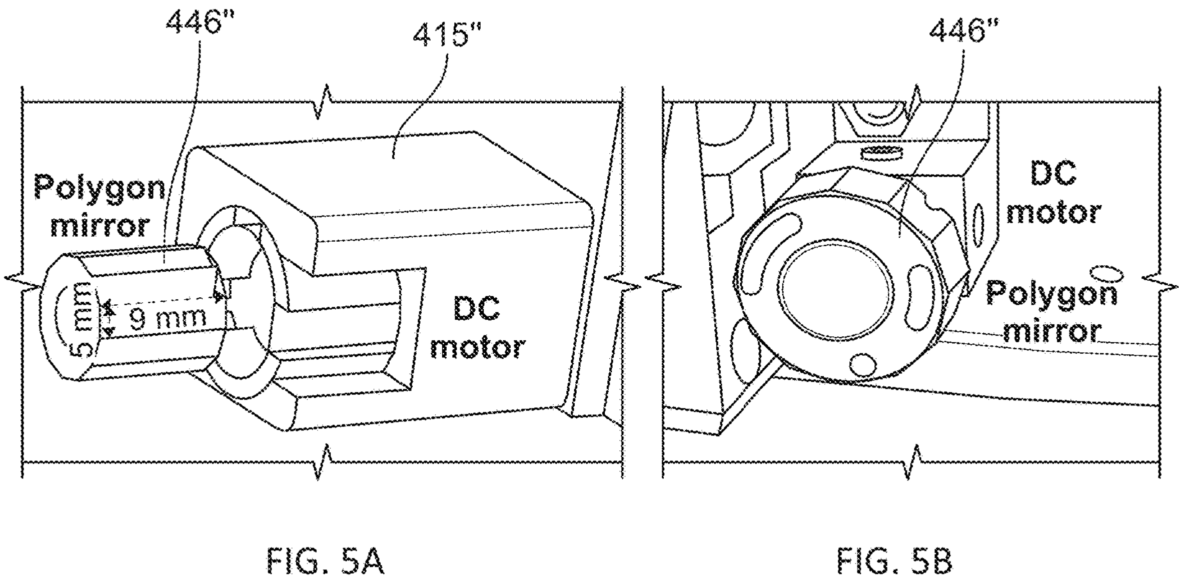
FIG. 5A is a perspective view of a 12-facet polygon scanner.
FIG. 5B is a perspective view of the 12-facet polygon scanner of FIG. 5A as part of a PAM system.

Another sample scanner assembly 400' for use in PAM systems, like the system 100, is shown schematically in FIG. 4. In the scanner assembly 400', light received from an objective assembly 300' that includes an objective lens 302' passes through an ultrasound transducer 490' resulting in beam 405. The beam 405 can then be subjected to a polygon scanner 446', with the polygon scanner 446' being able to rotate rapidly, as shown in a clockwise direction. In the illustrated embodiment, the polygon scanner 446' has eight (8) flat, or substantially flat, facets, though other shapes and configurations of scanners are contemplated herein with fewer than, or greater than, the eight (8) facets of the embodiment illustrated by FIG. 4. For instance, in the embodiment shown in FIGS. 5A and 5B, a 12-facet polygon scanner 446" having 12 flat, or substantially flat, reflective faces, rather than the eight (8) facets, is shown affixed to a DC motor 415" to facilitate rotating of the 12-facet polygon scanner 446".

According to at least some embodiments, each facet of a polygon scanner provides an independent image of the same target with relatively low spatial resolution, by confocally scanning an excitation laser light and the resultant ultrasound waves. In the example case of a 12-facet polygon scanner, a total of 12 images are acquired per revolution. The image acquired by the second facet is slightly shifted compared with the image acquired by the first facet, and so on. By stitching all the individual facet images together into a final composite image, the spatial resolution can be improved. During the stitching process, there is a possible misalignment of the facet images mostly due to the system instability and the polygon fabrication inaccuracy. At least some embodiments correct this through a registration process, wherein the first facet image is chosen as the fixed reference image known as (I1) and the images from the other eleven facets as the moving images known as (I2). The geometric transformations that map the images to be registered (I2) to the reference image (I1) are calculated. A "similarity" model can be used, which can include, for instance, translation, scaling, and rotation. According to at least some sample embodiments, a y-translation can be added to the transformation matrix because there is a y-axis shift between each facet. A geometric transformation can then be performed on each facet image (I2) to map coordinates in the output image to the corresponding coordinates in the input image. Each aligned facet image can be intertwined into one final composite image.

Returning to FIG. 4, upon interaction with the rapidly rotating polygon scanner 446', the beam 405 can be split into a plurality of sub-beams, illustrated herein as sub-beams 406, 407, and 408, though the number and configuration of sub-beams is determined by both the geometry of the polygon scanner 446' and the pulse width of the beam 405 arriving from the objective assembly 300'. As shown, the sub-beams 406, 407, and 408 can be refracted towards an imaging plane 460', which in the illustrated embodiment is disposed atop a water tank 440' supported by a motorized stage 450'. The water tank 440' provides a water environment for the ultrasound waves to propagate to the ultrasound transducer 490'. The motorized stage 450' provides the translation of the system or the sample along the direction perpendicular to that of the polygon scanner.

Figure 6:
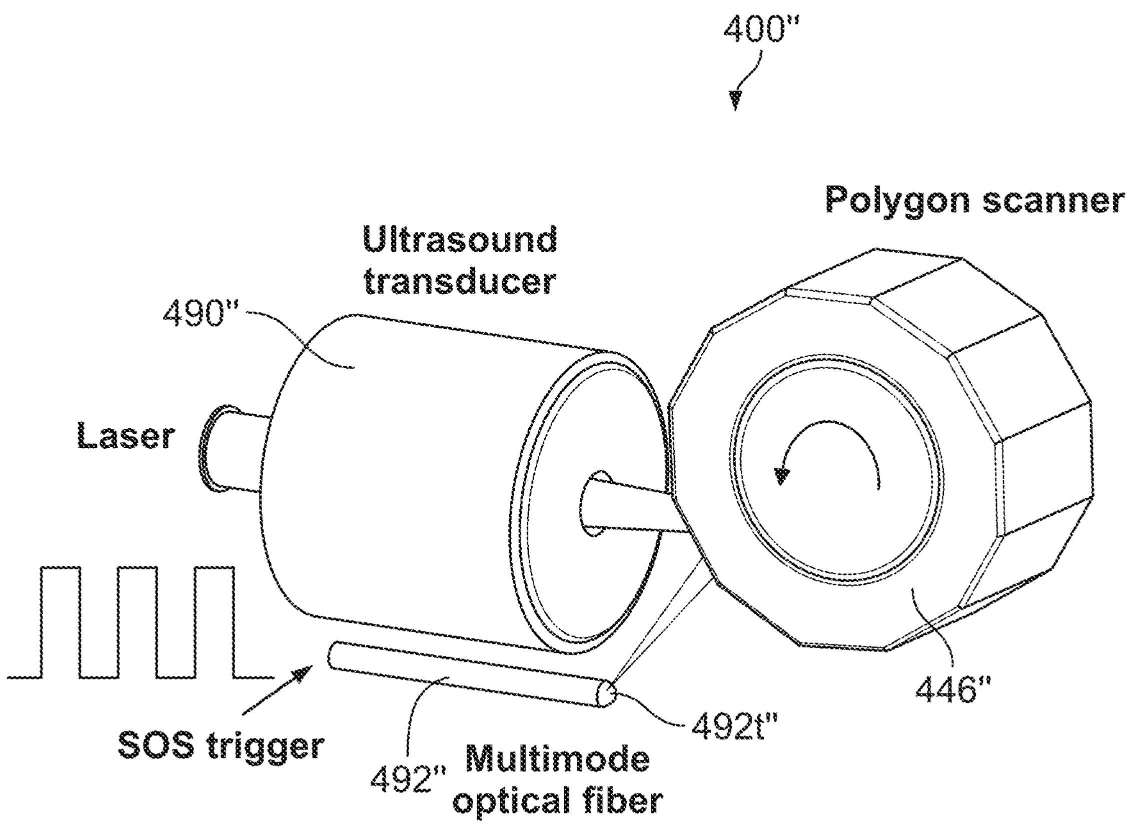
FIG. 6 is a schematic perspective view of a start of a scan system using the 12-facet polygon scanner and PAM system of FIG. 5B.

FIG. 6 shows a transducer and polygon scanner assembly 400" having an ultrasound transducer 490" and a 12-facet polygon scanner 446" that can be used as a scanner assembly as part of a PAM system, like the system 100. This transducer and polygon scanner assembly 400" further comprises a multimode optical fiber 492". The multimode fiber 492" (e.g., M45L02, Thorlabs) can be mounted beneath the ultrasound transducer 490" to receive the laser light. When the polygon scanner 446" rotates to the starting edge of each facet, the steered laser beam can land on a tip **492*t*" of the multimode optical fiber 492". A high-speed photodiode (e.g., PDA36A2, Thorlabs, but not shown) can be used to detect the received light by the fiber 492", and further, the photodiode can convert the received light intensity into a start-of-scan (SOS) trigger signal that provides the imaging system with the facet position of the polygon scanner 446"** and initiates the laser firing and data acquisition. A lab-made SOS system in accordance with the present disclosures can be compact with high accuracy. According to some embodiments, the SOS signal can trigger a field programmable gate array (FPGA) card that can synchronize photoacoustic (PA) lasers and a data acquisition (DAQ) card.

Figure 7A:
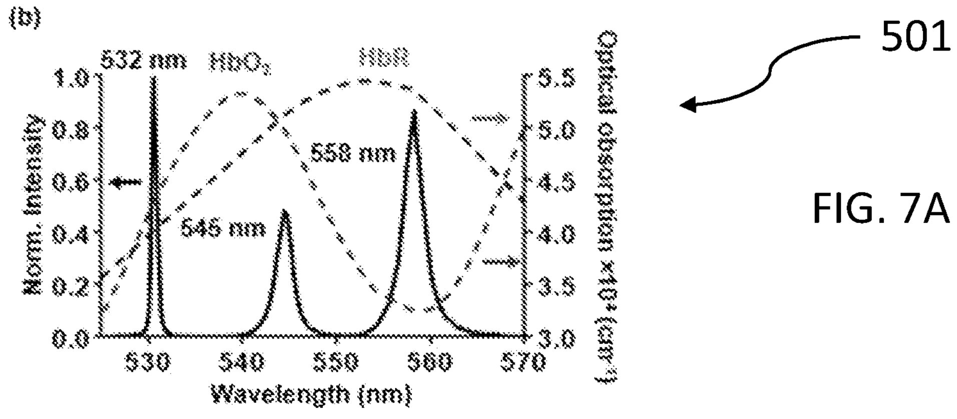
FIG. 7A is a graph illustrating an optical spectrum of the Raman path output and an absorption spectra of oxy-hemoglobin ($HbO_2$) and deoxy-hemoglobin (HbR) according to at least one embodiment of a PAM system.
Figure 7B:
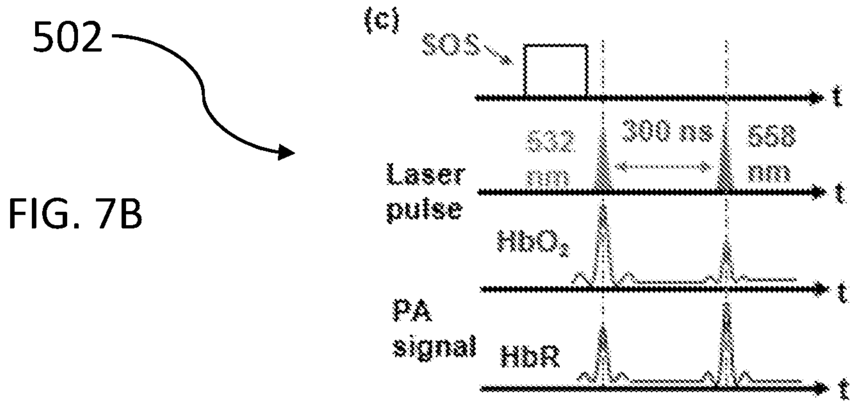
FIG. 7B is a diagram illustrating a dual-wavelength excitation sequence and resultant PA signals from the $HbO_2$ and HbR of FIG. 7A according to at least one embodiment.
Figure 7C:
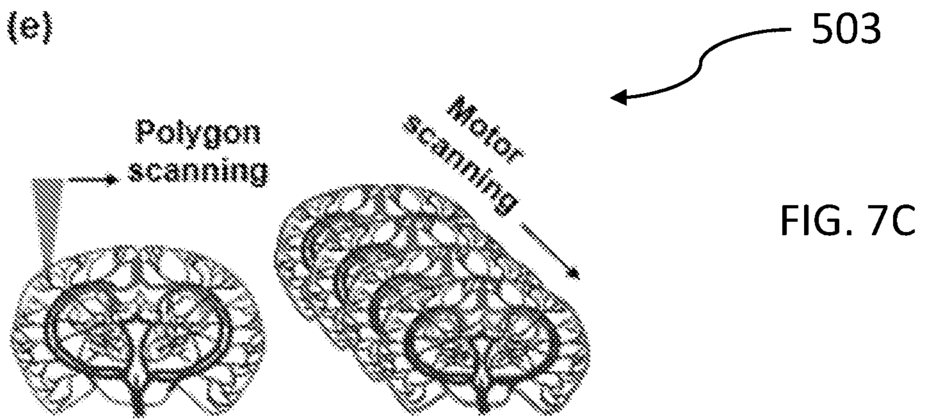
FIG. 7C is a schematic illustration of a sample of fast polygon scanning along an x-axis (fast axis) and motorized stage scanning along a y-axis (slow axis) according to a PAM system of at least one embodiment.

More particularly, UFF-PAM can provide the quantification of hemoglobin oxygenation by analyzing the PA signals generated by the two wavelengths from the Raman-shifter laser system (e.g., at 532 nm and 558 nm). Hemoglobin has two different formats: oxy-hemoglobin ($HbO_2$) and deoxy-hemoglobin (HbR), which have different absorption spectra, such as spectra 501 shown in FIG. 7A, and can be excited by the Raman laser at two wavelengths. Each laser pulse at each wavelength generates one-dimensional, time-resolved PA signal, with the time interval determined by the delay time between the two laser wavelengths, such as shown in chart 502 of FIG. 7B. Volumetric imaging of the hemoglobin oxygenation can be achieved by fast polygon scanning along the x-axis (fast axis) and motorized stage scanning along the y-axis (slow axis) as shown in samples 503 of FIG. 7C. In use, the SOS trigger as described above can be used to synchronize a fast-axis polygon scanning with a slow-axis motorized stage scanning. Both a vascular structure and an oxygenation map can be obtained by a single scan with dual-wavelength excitation. No optical wavelength switching is needed.

Figure 8A:
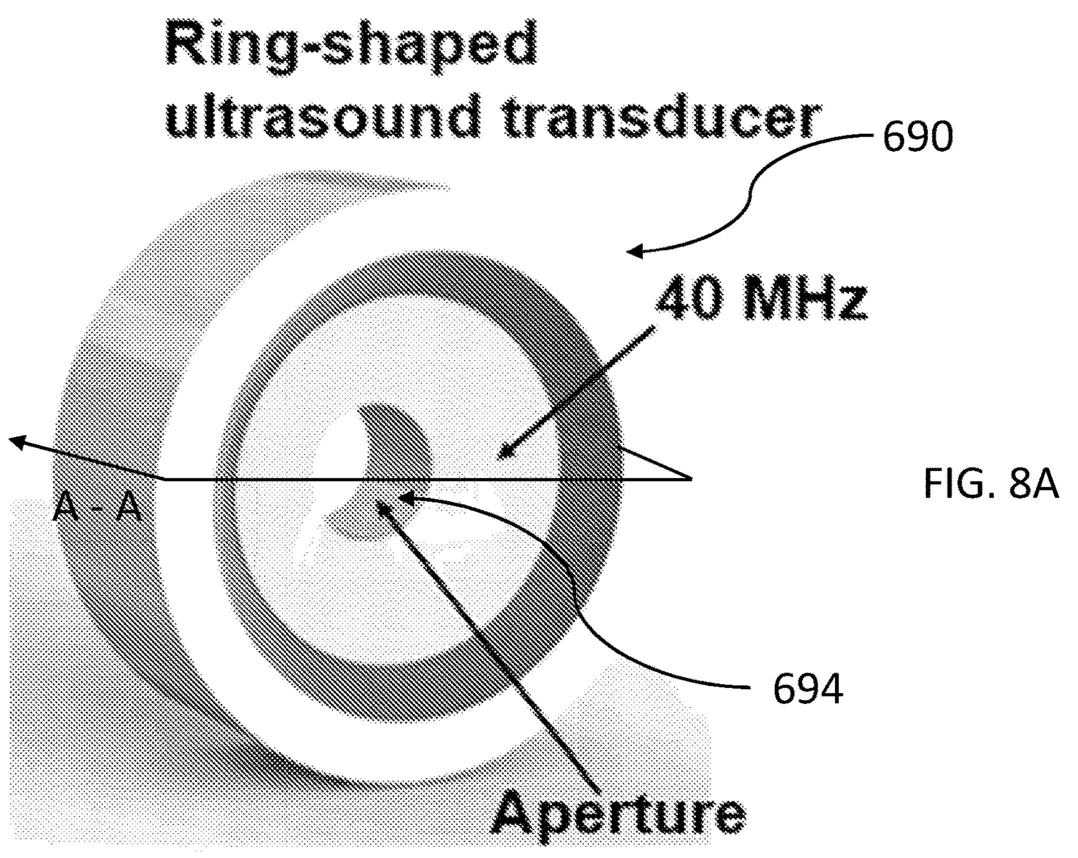
FIG. 8A is a perspective front view of a ring-shaped ultrasound transducer according to at least some embodiments.
Figure 8B:
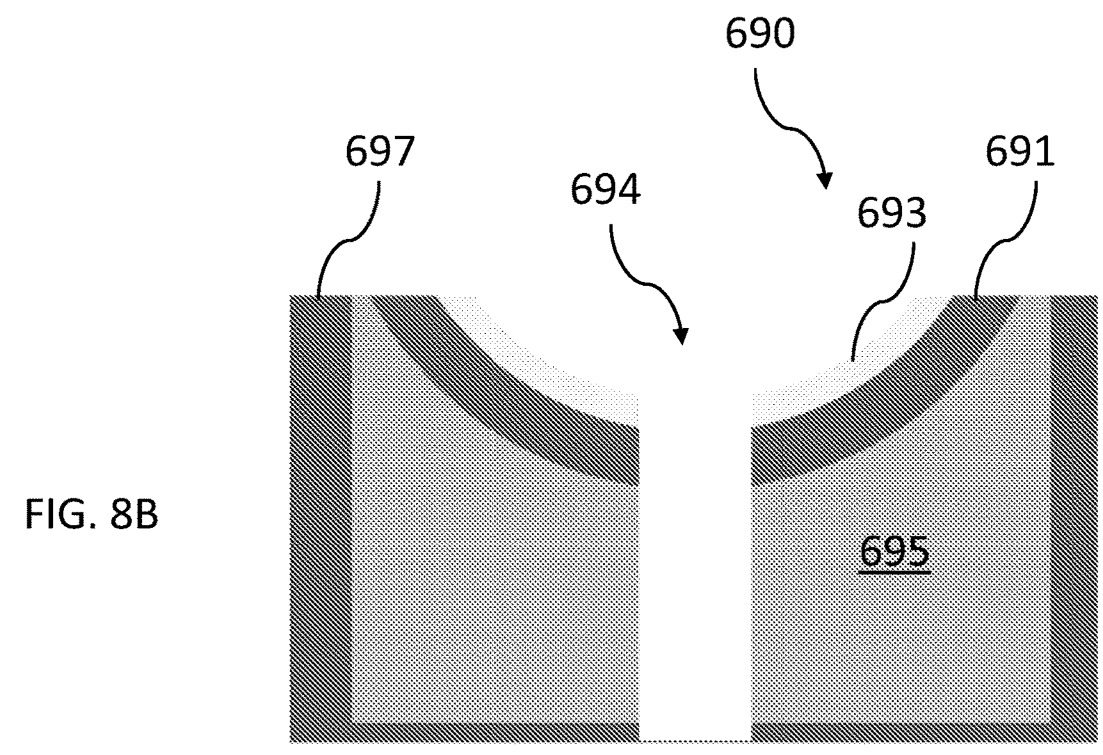
FIG. 8B is a cross-section of the ring-shaped ultrasound transducer of FIG. 8A taken along line A-A.

FIGS. 8A and 8B show an ultrasound transducer 690 according to at least some embodiments of the present disclosure. The ultrasound transducer 690 of the illustrated embodiment can have a central frequency of about 40 MHz. A lithium niobate (LNO) plate, having a thickness of approximately 70 μm in the illustrated embodiment, can act as a core piezoelectric layer 691. A first matching layer 693, as shown in the illustrated embodiment, a 10-μm-thick layer crafted from silver loaded epoxy and a 3-mm-thick backing material (e.g., conductive silver paste, E-solder 3022, Von Roll Isola) can be deposited onto the LNO plate 691, which can be backed by backing layer 695. The matched and backed acoustic stack formed from the first matching layer 693 and the LNO plate 691 can be machined into a ring or ring-shape and inserted and/or otherwise fixed into a brass housing 697 with a height, in the illustrated embodiment, of about 4 mm.

Figure 9:
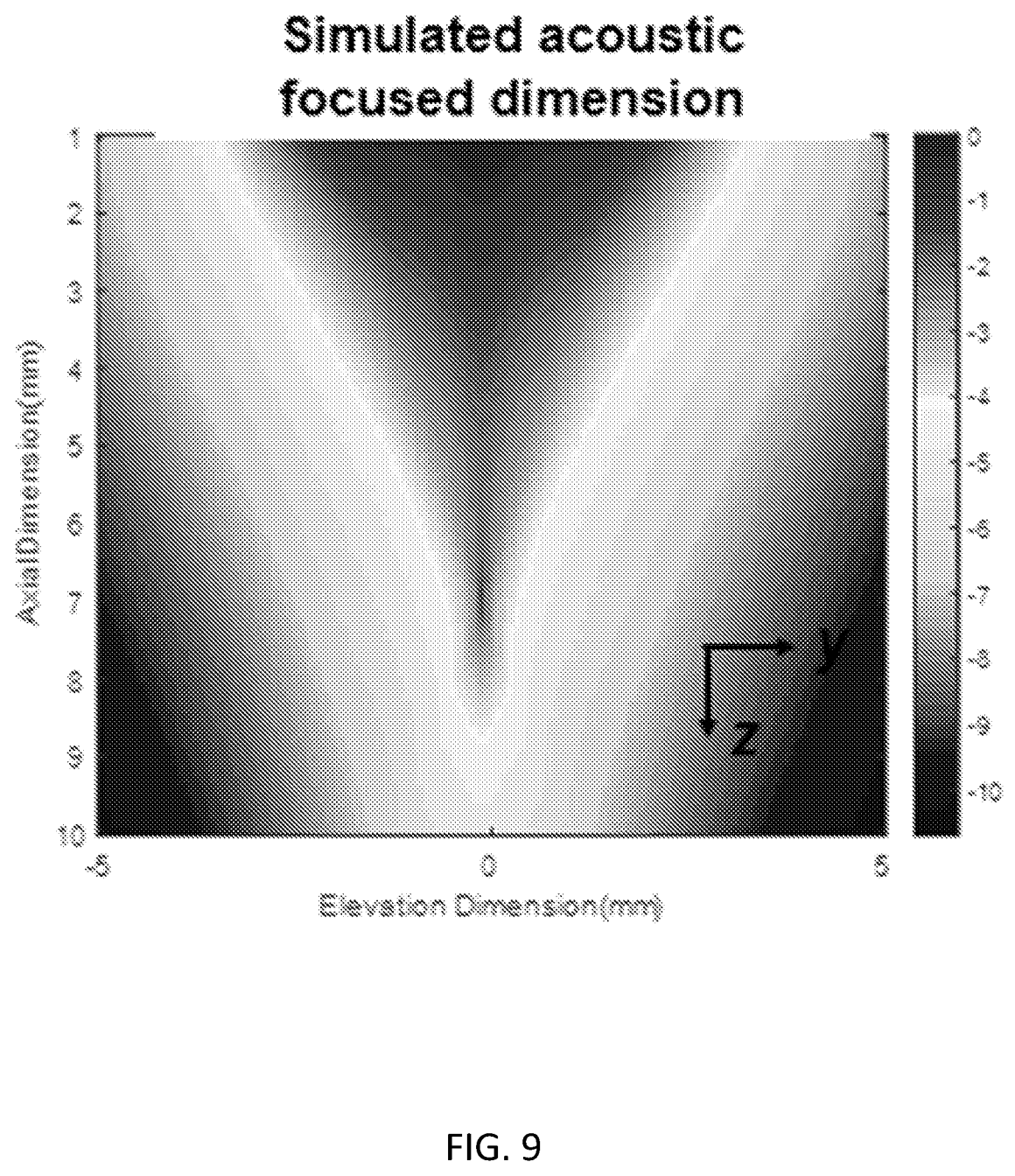

The ultrasound transducer 690 can have a central aperture 694, which in the illustrated embodiment has a diameter of about 3 mm. This aperture 694 can be drilled or otherwise formed to deliver light through the ultrasound transducer 690, enabling co-axial alignment of optical excitation and acoustic detection for maximum detection sensitivity. According to at least some embodiments, including the illustrated embodiment, the outer diameter of the transducer element can be about 6 mm. The gap can be filled with epoxy resin (e.g., EPO-TEK 301, Epoxy Technology) and one lead wire can be connected through the backing. After that, the transducer 690 can be pressed by a metal ball to form a focal length of about 8 mm. A Cr/Au (50/100 nm) electrode, by way of non-limiting example, can be sputtered across the first matching layer 693 and the brass housing 697 to form a common ground connection. Further, a 10-μm-thick parylene layer (not shown in the figure) can be deposited onto an entire external surface of the transducer 690 as a second matching layer to compensate for the acoustic impedance mismatch with water. The normalized acoustic pressure field of the ultrasound transducer 690 is simulated and shown in FIG. 9, illustrating the spherically focused ultrasound field in the axial-elevational plane with a focal distance of 8 mm.

Figure 10:
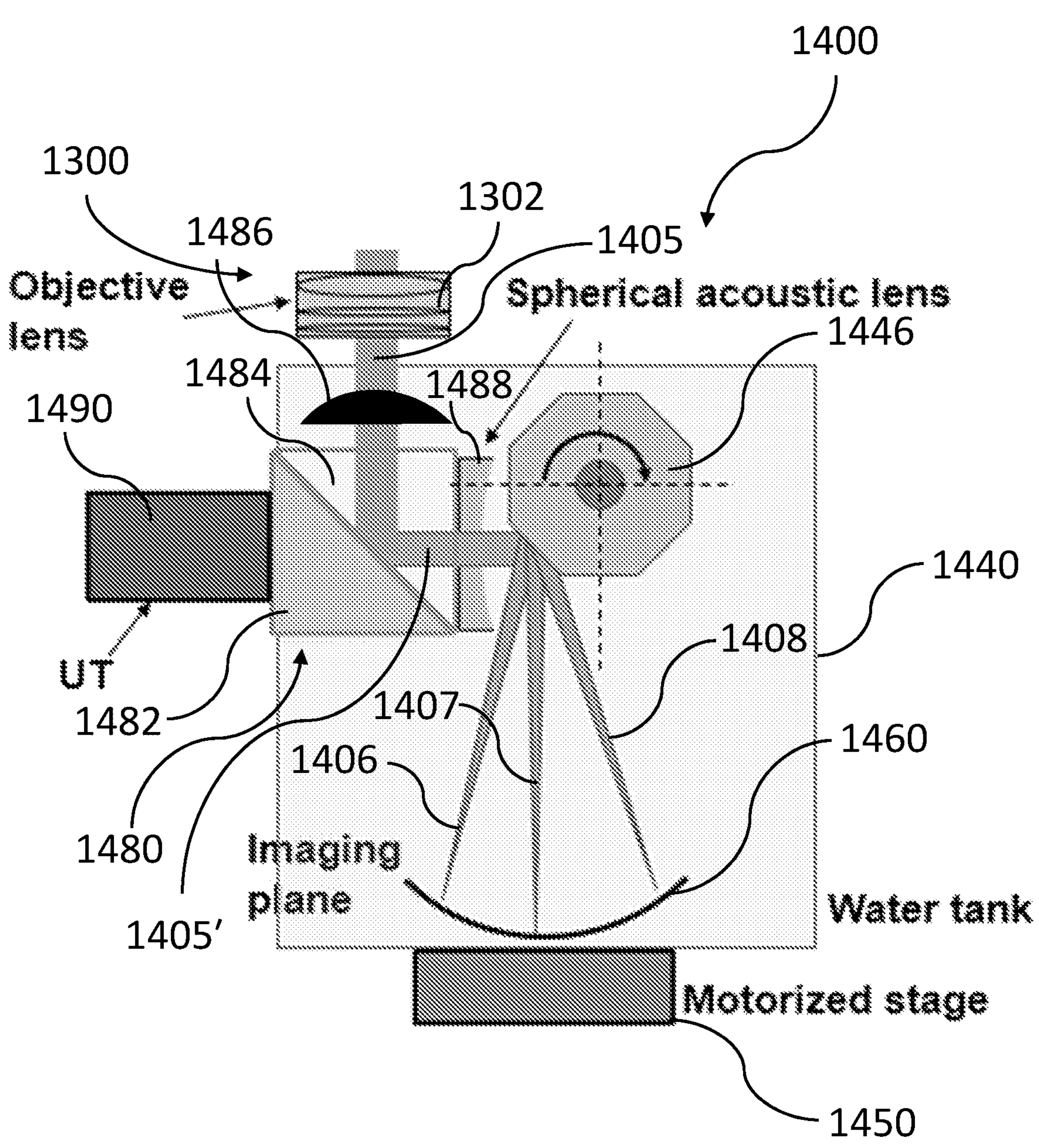
FIG. 10 is a schematic side view of a component of a PAM system comprising a water-immersible polygon scanner with an optical-acoustic combiner.

FIG. 10 shows an alternative embodiment of a scanner assembly 1400 similar to the scanner assemblies 400, 400', and 400" discussed above and also useful in conjunction with PAM systems, such as the system 100. Light enters the scanner assembly 1400 through an objective lens 1302 of an objective assembly 1300. The scanner assembly 1400 can accommodate a water-immersible polygon scanner 1446, in which a substantially flat ultrasound transducer 1490 can be used instead of the ring-shaped ultrasound transducer 490' of the scanner assembly 400'. In this design, an optical-acoustic beam combiner 1480 is present. In the illustrated embodiment, the beam combiner 1480 can be composed of an aluminum-coated prism 1482 (e.g., NT32-331 from Edmund, Inc.) and an uncoated prism 1484 (e.g., NT32-330 from Edmund, Inc.), and can provide optical-acoustic coaxial alignment. As shown, the thin aluminum coating of the prism 1482 can reflect light and transmit sound. An optical correction lens 1486 can be attached to, or proximate to, a top surface of the combiner 1480. The lens 1486 can correct the optical aberration due, at least in part, to the prism 1482. Further, as shown, an acoustic lens, such as a spherical acoustic lens 1488, can be disposed at or proximate to an output location of the combiner 1480 to receive an output of the combiner 1480. The lens 1488 can focus photoacoustic waves output by the combiner 1480. Although in the illustrated embodiment the acoustic lens 1488 is spherical, other configurations, including but not limited to those illustrated and/or described elsewhere herein, are contemplated.

As shown, a laser or light beam 1405 can be directed from the objective assembly 1300, through the optical correction lens 1486, and to the combiner 1480. A resulting laser or light beam 1405' can then leave the combiner 1480, pass through the spherical acoustic lens 1488, and to the scanner 1446. The focused laser beams and the generated photoacoustic waves can both be directed by the water-immersible polygon scanner 1446 in a coaxial configuration. More particularly, as shown the photoacoustic waves can be focused by the spherical acoustic lens 1488, and detected by the ultrasonic transducer 1482 (e.g., V214-BB-RM, Olympus-NDT, Inc.; central frequency: 50 MHz; one-way −6 dB bandwidth: 100%). Similar to the scanner assembly 400' of FIG. 4, sub-beams 1406, 1407, and 1408 can be refracted towards an imaging plane 1460, which in the illustrated embodiment is disposed within a water tank 1440 supported by a motorized stage 1450.

Figure 11:
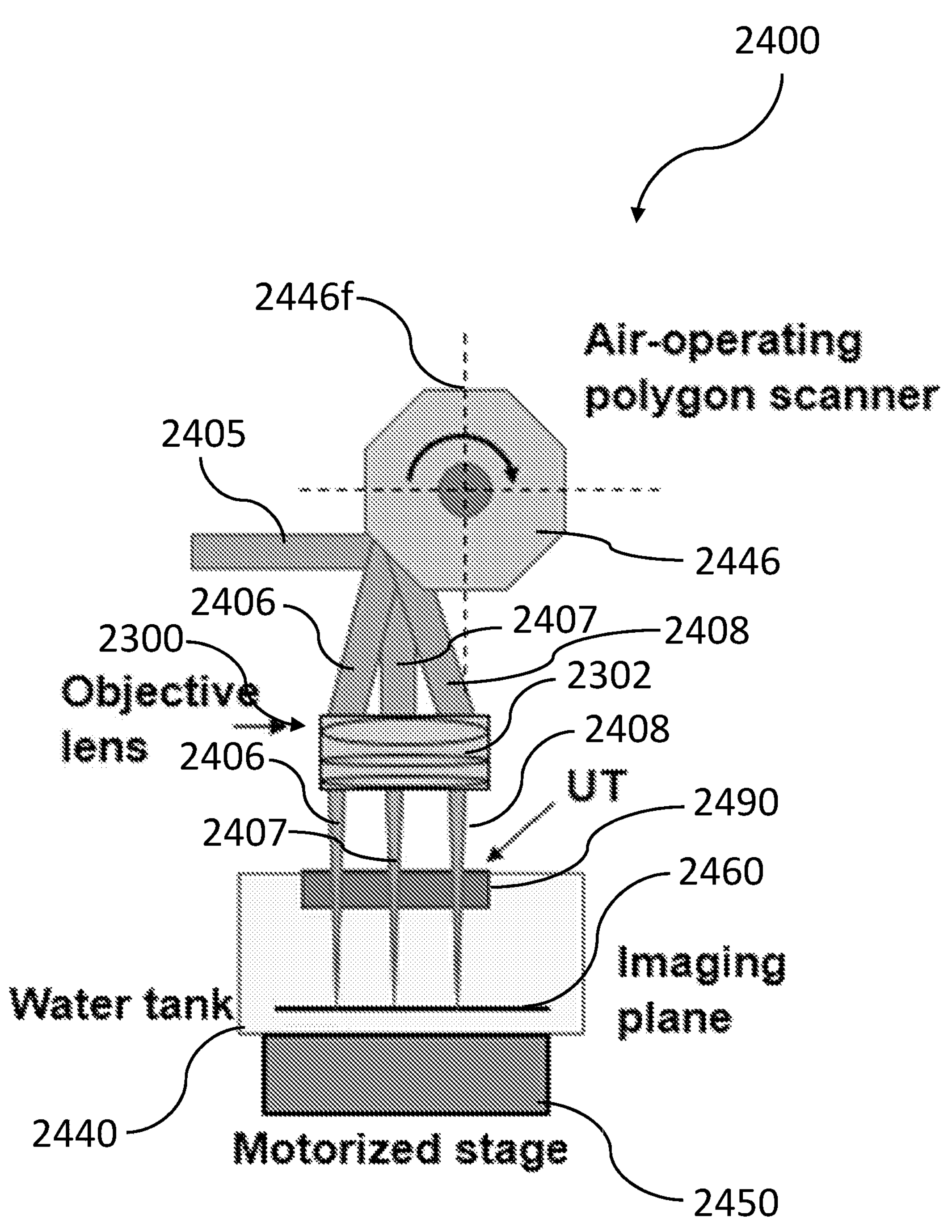
FIG. 11 is a schematic side view of a component of a PAM system comprising an air-operated polygon scanner with a cylindrically focused ultrasound transducer.

FIG. 11 shows an alternative embodiment of a scanner assembly 2400 similar to the scanner assemblies 400, 400', 400", and 1400 discussed above and also useful in conjunction with PAM systems, such as the system 100. The scanner assembly 2400 is configured to use an air-operated polygon scanner 2446, and according to at least some embodiments, an air-operated polygon scanner can be more durable and stable than a water-immersible polygon scanner. As shown, the polygon scanner 2446 can direct a focused excitation light 2405, received, for example, from an objective assembly as provided for elsewhere herein, along the focal line of a cylindrically-focused ultrasound transducer 2490, forming sub-beams 2406, 2407, and 2408. The polygon scanner 2446 can have several faces acting as polygon mirrors **2446*f*, similar to other embodiments provided for herein. According to at least some embodiments, these polygon mirrors 2446*f* can be made of fused silica, and according to other or the same embodiments the mirror surface can be coated with protective aluminum for high optical reflection of light (approximately >95% reflectivity). In the illustrated embodiment, each polygon mirror 2446*f* can be approximately 5 mm by approximately 6 mm, though other dimensions are contemplated within the scope of this disclosure. A notable difference between the scanner assembly 2400 and assemblies such as the assemblies 400 and 400' is that the scanner assembly 2400 does not steer the acoustic beam; it only steers the focused light beam 2405**.

To actuate the polygon scanner 2446, a high-precision micro-DC motor (not shown) can be operated, among other actuation mechanisms known to those skilled in the art. For each DC-motor revolution, the polygon scanner 2446 can provide repeated cross-sectional scans (B-scans), and according to at least some embodiments may achieve a B-scan rate of up to about 16 kHz. Unlike the polygon scanner assemblies 400' and 1400 discussed above, the polygon scanner 2446 does not steer acoustic waves. Rather, the polygon scanner 2446 operates in air according to the illustrated embodiment, which can result in improved stability and repeatability. According to at least some embodiments, 3D volumetric PA imaging can be achieved by the fast polygon scanning operating at up to approximately 16 kHz, and slow scanning with a motorized stage operating at up to approximately 10 Hz (e.g., V-528, PI; maximum speed, about 250 mm/s). For each facet image provided by the polygon scanner 2446 along the horizontal axis with a step size of approximately 10 μm, the motorized stage provides one step along the orthogonal axis with a step size of approximately 10 μm. The air-operating polygon scanner 2446 can direct an excitation light, as shown sub-beams 2406, 2407, and 2408, towards an objective lens 2302 of an objective assembly 2300, which can focus the excitation light, still identified as sub-beams 2406, 2407, and 2408, into the ultrasound transducer 2490. The ultrasound transducer 2490 in the illustrated embodiment is mounted within a water tank 2440, further containing a substantially flat imaging plane 2460 disposed above motorized stage 2450.

Figures 12A, 12B:
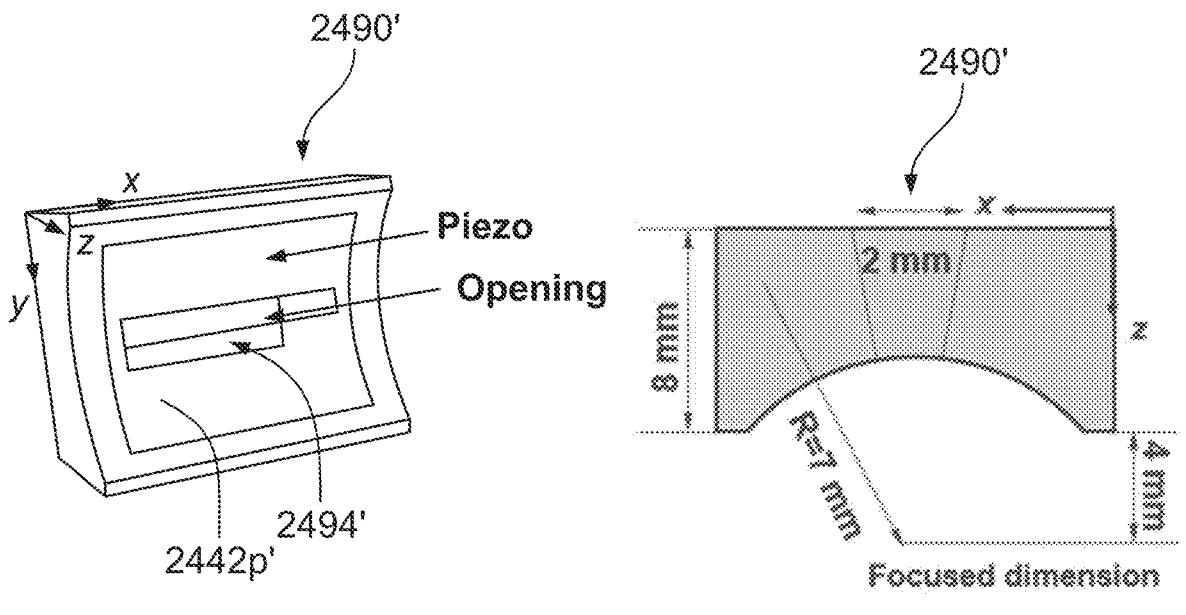
FIG. 12A is a perspective side view of a cylindrically-focused ultrasound transducer utilized in some embodiments.
FIG. 12B is a side view of the cylindrically-focused ultrasound transducer of FIG. 12A.

FIGS. 12A and 12B show an embodiment of a cylindrically-focused ultrasound transducer 2490' that can be used in various embodiments where an ultrasound transducer is provided, as well as other embodiments derivable from the present disclosures. While the ultrasound transducer 690 of FIG. 8 utilizes a spherically-focused ultrasonic transducer to provide relatively high detection sensitivity, the transducer 2490' requires rotating an associated polygon scanner, such as the scanner 1446, in water, resulting in a reduction to system stability. A cylindrically-focused transducer 2490' is, accordingly, useful for other embodiments such as those utilizing the polygon scanner 2446. Lithium niobate (LNO) (e.g., Boston Piezo-Optics, Bellingham, MA, USA) can be used due, at least in part, to its strong piezoelectric effect and low permittivity that can jointly provide superior acoustic sensitivity and thus improved imaging sensitivity when compared with traditional piezo ceramics and polymers.

Figure 13:
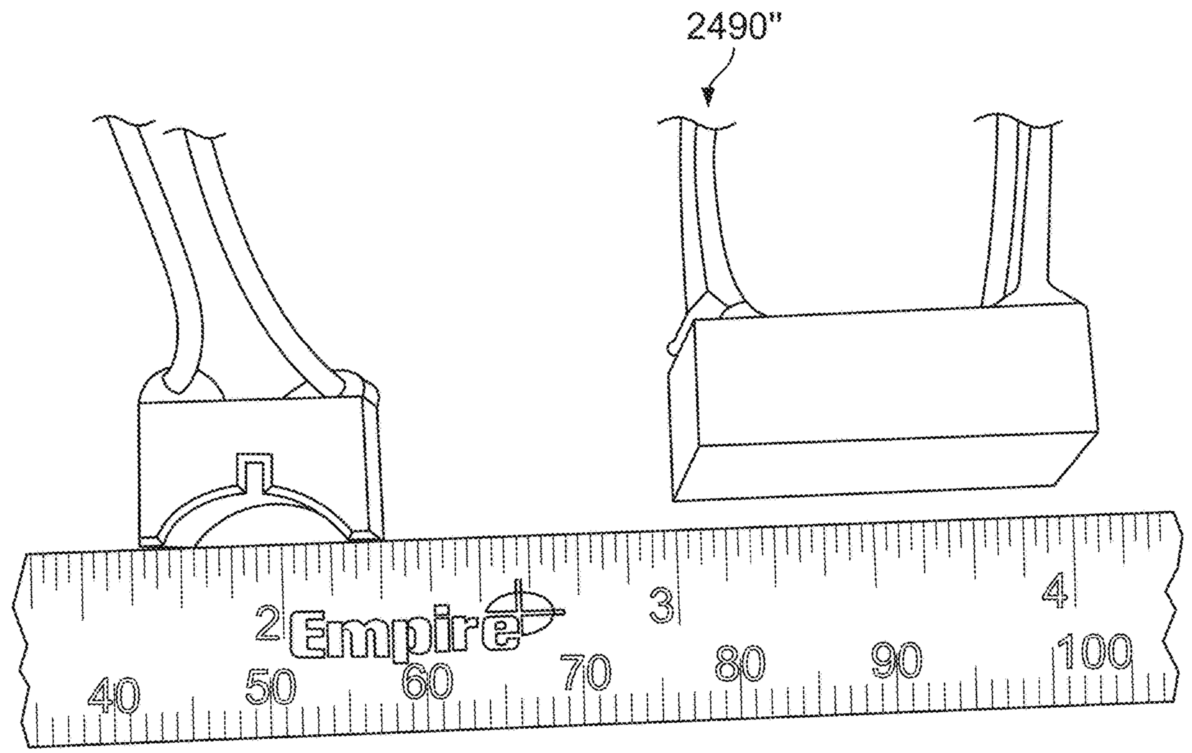
FIG. 13 is a top view of a cylindrically-focused ultrasound transducer utilized in some embodiments similar to that of FIGS. 11A and 11B.

As shown, a rectangular slot or opening 2494' can be provided for light to pass through and scan along the focal line. According to at least some embodiments, the size of an LNO 2491' in at least some instances can be approximately in the range of about 10 mm to about 15 mm in length, approximately in the range of about 6 mm to about 10 mm in width, and have about an approximately 2-mm-wide opening 2494' formed therein, which can cover a large field of view and allows the excitation light going through. The one-dimensional focal length can be approximately in the range of about 7 mm to about 10 mm. The central frequency can be approximately in the range of about 30 MHz to about 50 MHz with a one-way −6 dB bandwidth approximately in the range of about 50% to about 100%, which can provide high spatial resolution in the depth direction. The transducer 2490' can have an electrical impedance approximately in the range of about 25 ohms to about 50 ohms at the center frequency and a receiving sensitivity approximately in the range of about 1 μV/Pa to about 2 μV/Pa, which can provide high detection sensitivity. Two matching layers with thicknesses of about a quarter wavelength can be used to compensate for acoustic impedance mismatch between the LNO plate (e.g., Za~34.5 MRayl) and water (e.g., Za~1.5 MRayl) and thus further improve the detection sensitivity. A silver loaded epoxy (e.g., Za~7.3 MRayl) and approximately in a range of about 2 μm to about 3 μm silver powder can be used as a first matching layer. A parylene C dimer (e.g., DPX-C, Specialty Coating Systems) can be applied as a second matching layer (e.g., Za~2.5 MRayl). A conductive silver paste (e.g., E-solder 3022, Von Roll Isola) (e.g., Za~5.9 MRayl) can be used as a backing material. The focal line of the acoustic beam with a full-width of half maximum approximately in the range of about 45 μm to about 100 μm. A cylindrically focused transducer 2490" according to one embodiment is shown in FIG. 13, with a width of the transducer 2490" being illustrated on a left side of the image and a length of the transducer 2490" being illustrated on a right side of the image.

Figure 14:
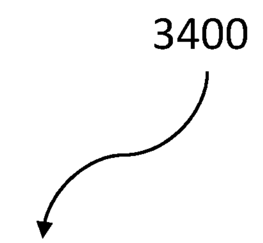
FIG. 14 is a schematic side view of a component of a PAM system comprising an air-operated polygon scanner with an optical-acoustic beam combiner.
Figure 14:
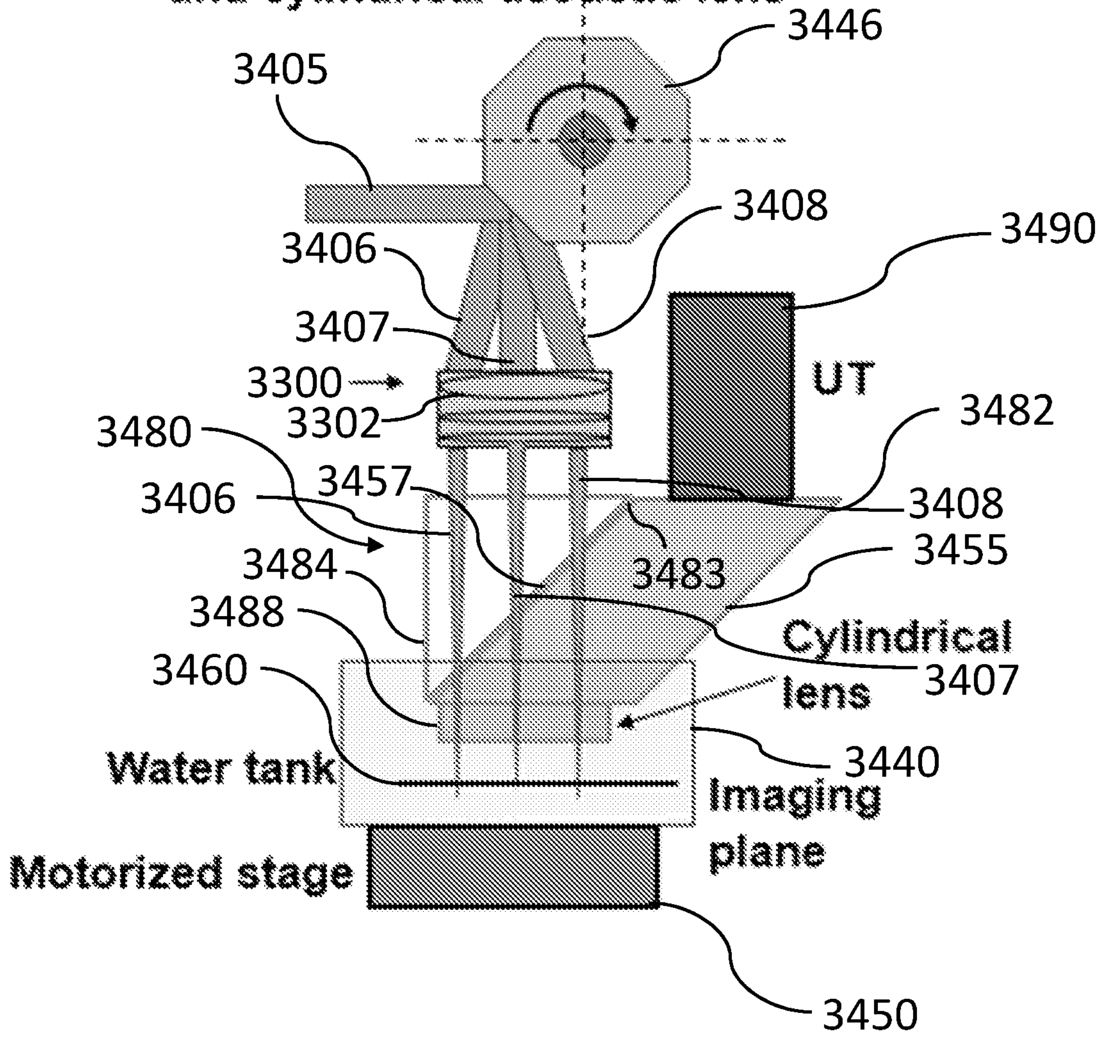

FIG. 14 shows another alternative embodiment of a scanner assembly 3400 configured to use an air-operated polygon scanner 3446. As shown, a substantially flat ultrasound transducer 3490 can be used instead of a cylindrically-focused ultrasound transducer of other embodiments (e.g., the transducer 2490 of FIG. 11). In this illustrated embodiment, an optical-acoustic beam combiner 3480 can include an aluminum-coated right-angled prism 3484 (e.g., 89-626 from Edmund Optics, Inc.), an uncoated rhomboid prism 3482 (e.g., 47-807 from Edmund Optics, Inc.), and a thin layer of silicone oil 3483 can be sandwiched between the two prisms 3484, 3482. A plano-concave cylindrical lens 3488 (e.g., LK1836L1 from Thorlabs, Inc.) can also be provided. In at least some embodiments, the cylindrical lens 3488 can have a curvature of about 5.0 mm and can be attached or proximate to a bottom surface of the rhomboid prism 3482. In some embodiments, the estimated one-dimensional focal length of acoustic focusing can be about 6.5 mm. In the illustrated embodiment, the polygon scanner 3446 directs a PA excitation light 3405 into a plurality of sub-beams, as shown sub-beams 3406, 3407, and 3408, towards a top of the optical-acoustic beam combiner 3480. The sub-beams 3406, 3407, and 3408 can pass through the beam combiner 3480 and be directed in a more focused state towards an imaging target. The resultant ultrasound signals, i.e., the sub-beams 3406, 3407, and 3408, can be further focused by the cylindrical lens 3488, and can then be reflected by two major parallel surfaces 3455 and 3457 and subsequently detected by a substantially flat ultrasonic transducer 3490 (e.g., V214-BB-RM from Olympus-NDT, Inc.). According to at least some embodiments, the substantially flat ultrasonic transducer 3490 can have a central frequency of about 50 MHz and a one-way about −6 dB bandwidth of about 100%. In accordance with the present disclosures, an air-operated polygon scanner 3446 can steer an excitation light beam through an objective lens 3302 of an objective assembly 3300 that focuses the light beam through the beam combiner 3480 on the surface of an imaging target, such as the imaging target 448 illustrated in FIG. 1. In at least some embodiments seeking to maximize the detection sensitivity, the optical focus and the acoustic focal line can be confocally aligned along the scanning trajectory. In other or the same embodiments seeking to achieve volumetric imaging, the focused light beam can be steered by the polygon scanner 3446 along the acoustic focal line of the cylindrical lens 3488 positioned above an imaging plane 3460 disposed in a water tank 3440, the water tank 3440 being coupled to or otherwise associated with a motorized stage 3450. In at least some instances, a volumetric imaging rate of 2 Hz can be achieved by one or more of the various embodiments disclosed over a FOV of about 10 mm with a high spatial resolution of at least about 10 μm.

Figure 15:
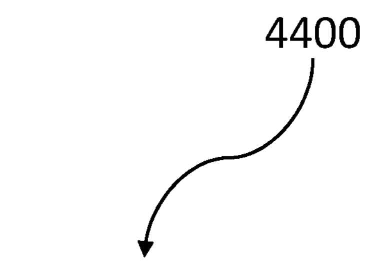
FIG. 15 is a schematic side view of a component of a PAM system comprising an air-operated polygon scanner with a transparent ultrasound transducer.
Figure 15:
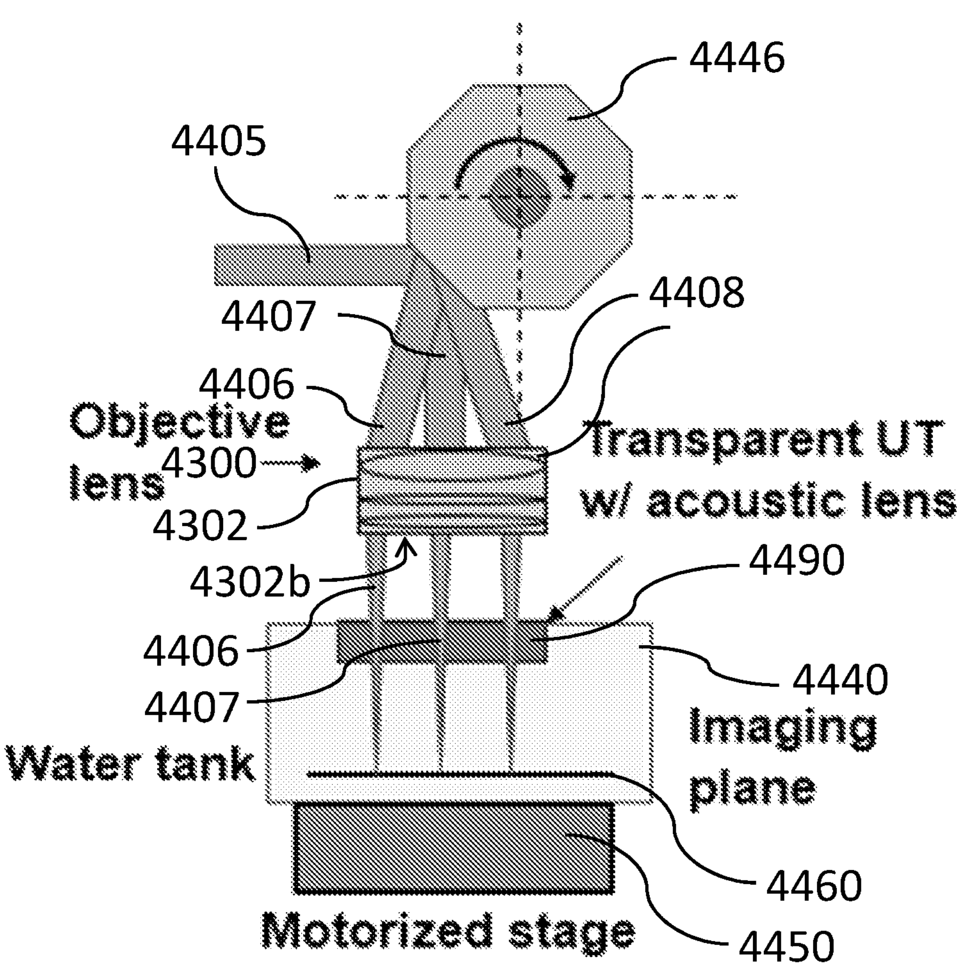

FIG. 15 shows still another embodiment of a scanner assembly 4400 configured to use an air-operated polygon scanner 4446. As shown, an optically transparent ultrasound transducer 4490 is used instead of non-transparent ultrasound transducers used in at least some other embodiments disclosed herein (e.g., the transducers 1490 and 2490" of FIGS. 10 and 13, respectively). The polygon scanner 4446 can direct an excitation light 4405 into a plurality of sub-beams, as shown sub-beams 4406, 4407, and 4408, towards a back aperture **4302*b* of an objective lens 4302 of an objective assembly 4300 and according to at least one embodiment this objective lens 4302 has a focal length of about 50 mm (e.g., AC254-050-A from Thorlabs, Newton, NJ, USA). A back focal point of the objective lens 4302 can be coincident with a pivot point of the scanner 4446. The objective lens 4302 can focus the light directly through the transparent ultrasound transducer 4490 onto a surface of a target, such as the imaging target 448 illustrated in FIG. 1. To maximize the detection sensitivity, the optical focus and the acoustic focal line can be confocally aligned along the scanning trajectory. Such confocal alignment can be useful for detecting the in-phase acoustic waves generated by the light, which can maximize the detected signal strength by constructive wave interference. The maximized detection sensitivity can be important in at least some embodiments as it can allow the imaging of targets with small sizes and/or weak optical absorption. In at least some embodiments seeking to achieve volumetric imaging, the focused light beam 4405 can be steered by the polygon scanner 4446 along the acoustic focal line of the transparent transducer 4490**. In other or the same embodiments, the slow axis can be scanned using a motorized scanning stage (e.g., L-509 from PI, Auburn, MA, USA), as would be understood by a person skilled in the art in view of the person's knowledge and the various embodiments described herein. Similar to other embodiments, an imaging plane 4460 can be disposed in a water tank 4440, the water tank 4440 being coupled to or otherwise associated with a motorized stage 4450.

As proof-of-concept, UFF-PAM of hemodynamic responses in mouse brains to hypoxia, sodium nitroprusside (SNP) induced systemic hypotension, and ischemic stroke have been demonstrated. For hypoxia challenge, UFF-PAM monitored the global hemoglobin deoxygenation in the brain and the resultant vasodilation. For the SNP challenge, UFF-PAM imaged the progress of arterial dilation and the resultant blood oxygenation dynamics. For the ischemic stroke, UFF-PAM captured the functional response of brain microvasculature during and post the stroke, particularly, the stroke-induced spreading depolarization (SD) waves. Enabled by the large FOV and high imaging speed, UFF-PAM can precisely pinpoint the SD wave's originating position, and track its propagation direction and spreading pattern. With high spatial resolution, UFF-PAM can clearly resolve the local vasoconstriction and deoxygenation associated with the SD waves on the single-vessel level. All in all, with its unique capability of capturing fast hemodynamics, UFF-PAM can become a powerful tool to address a multitude of important questions in functional brain research.

Figure 16:
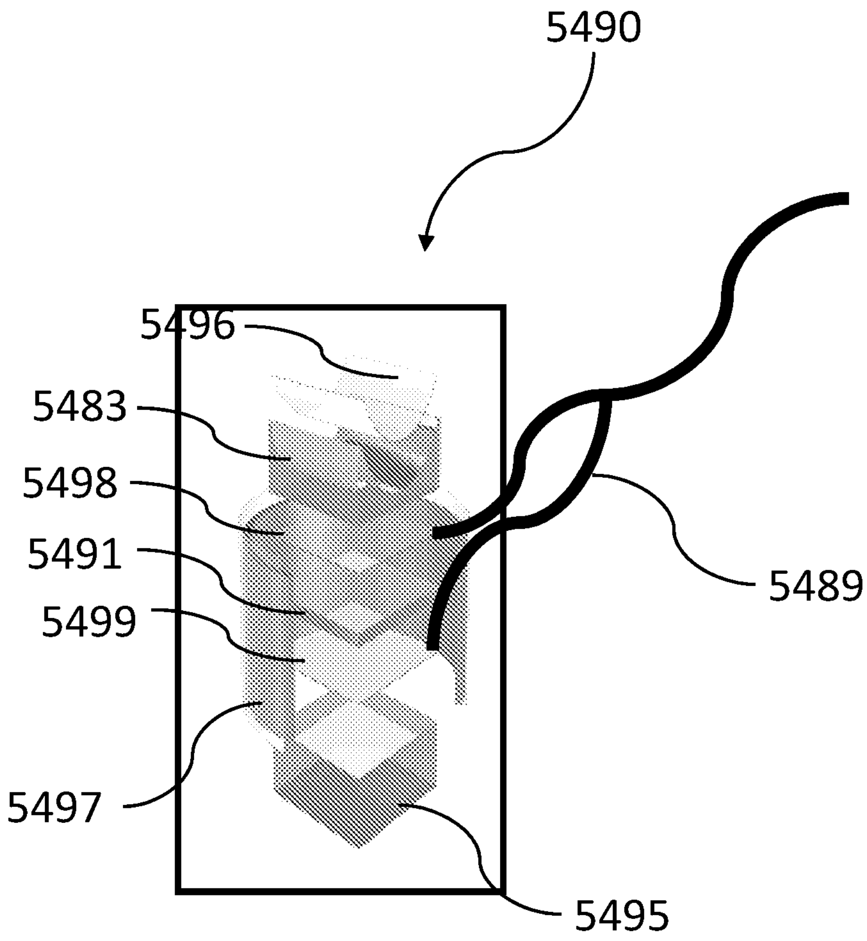
FIG. 16 is a schematic perspective assembly view of a cylindrically-focused transparent ultrasound transducer.

FIG. 16 shows one example of the cylindrically-focused transparent ultrasound transducer 5490 (e.g., CFT-UT). The transducer 5490 includes a core piezo-electric material 5491, illustrated as a piece of transparent lithium niobate (LNO) (e.g., Boston Piezo-optics, MA, USA), with a length and thickness of about 10 mm and about 100 m, respectively. A thin layer 5496 of indium tin oxide (ITO) with a thickness of about 100 nm can be coated on both sides of the LNO 5491, for example using a dielectric sputter system (e.g., PVD750, Kurt Lesker, PA, USA). A coaxial cable 5489 can be connected to upper and lower ITO electrodes 5498 and 5499, respectively, with conductive silver paste (e.g., E-solder 3022), which can collect the voltage potential between the two LNO plate surfaces. Then the core piezo-electric material 5491 can be packaged in a housing 5497, which in the illustrated, non-limiting embodiment is ring-shaped, copper, and fixed with a transparent backing layer 5495. In at least some embodiments, the transparent backing layer 5495 can be made of epoxy with a thickness of about 1 cm (e.g., Epotek 301). All the above materials (LNO, ITO, epoxy backing) jointly provide the high transparency of the transducer 5490. A transparent plano-concave cylindrical lens 5483 (e.g., LK1836L1 from Thorlabs, Newton, NJ, USA) can be attached to a bottom of the core piezo-electric material 5491, for example using transparent UV glue. The estimated one-dimensional focal length of the acoustic focusing can be about 6.5 mm, which can provide the high detection sensitivity of the transducer along the focal line. Finally, an approximately 10 μm thick parylene film (e.g., Parylene C, Specialty Coating Systems, Indianapolis, IN, USA) layer can be vapor-deposited onto the external surface of the whole transducer package for protection and acoustic impedance matching.

Figure 17:
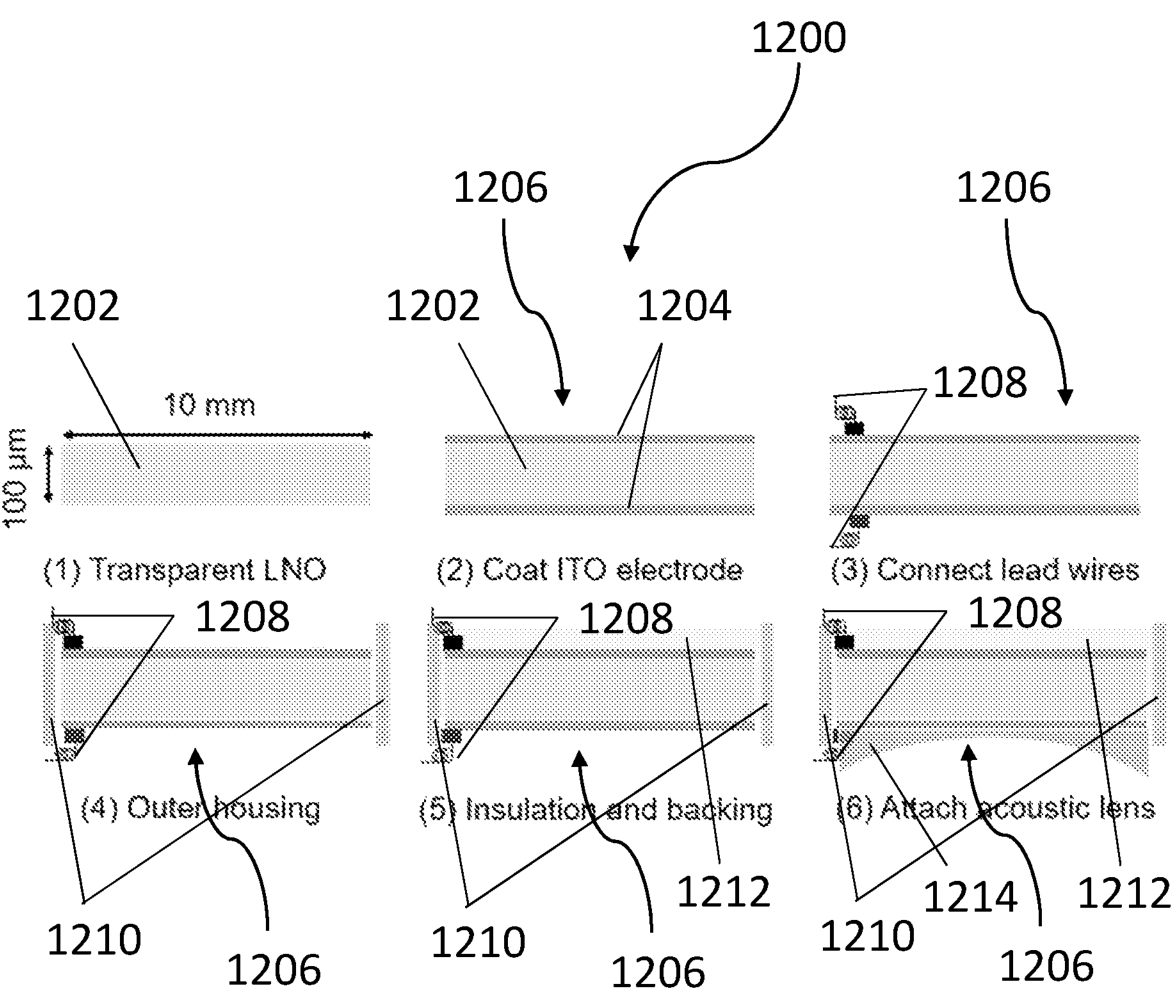
FIG. 17 is a diagram depicting steps of a fabrication process for producing the cylindrically-focused transparent ultrasound transducer of FIG. 14.

FIG. 17 is a work-flow diagram 1200 depicting steps of a fabrication process for a cylindrically-focused transparent ultrasound transducer such as the transducer 5490. As shown in step or action (1), a transparent LNO plate 1202 can be provided that allows an excitation light to pass or otherwise go through it. In the illustrated embodiment, the plate 1202 has a length of about 10 mm and a thickness of about 100 μm. The LNO plate 1202 can be highly transparent with high piezoelectricity and low permeability, providing high acoustic detection sensitivity. The LNO plate 1202 can be coated with a coating 1204, as shown in step or action (2), for example using magnetron sputtering and/or electron beam deposition, forming a coated ITO electrode 1206. The coated ITO electrode 1206 is transparent and thus allows for excitation light to go through it. Lead wires 1208 can be connected to the coated electrode 1206, as shown in step or action (3), which provide reliable electrical signal detection from LNO surfaces of the coated electrode 1206. An outer housing 1210 can be provided, encasing the coated ITO electrode 1206 and the lead wires 1208, as shown in step or action (4), which provides protection of the entire transducer and/or isolation of electrical interference. Further, insulation and/or backing, illustrated as a single insulation-backing component 1212, can also be provided, coupled to at least a portion of the coated ITO electrode 1206 as shown in step or action (5). The insulation and/or backing can provide high acoustic detection bandwidth. Still further, an acoustic lens 1214 can be attached to the coated ITO electrode 1206, as shown in step or action (6), which can further improve the detection sensitivity of the resulting transducer.

Figure 18:
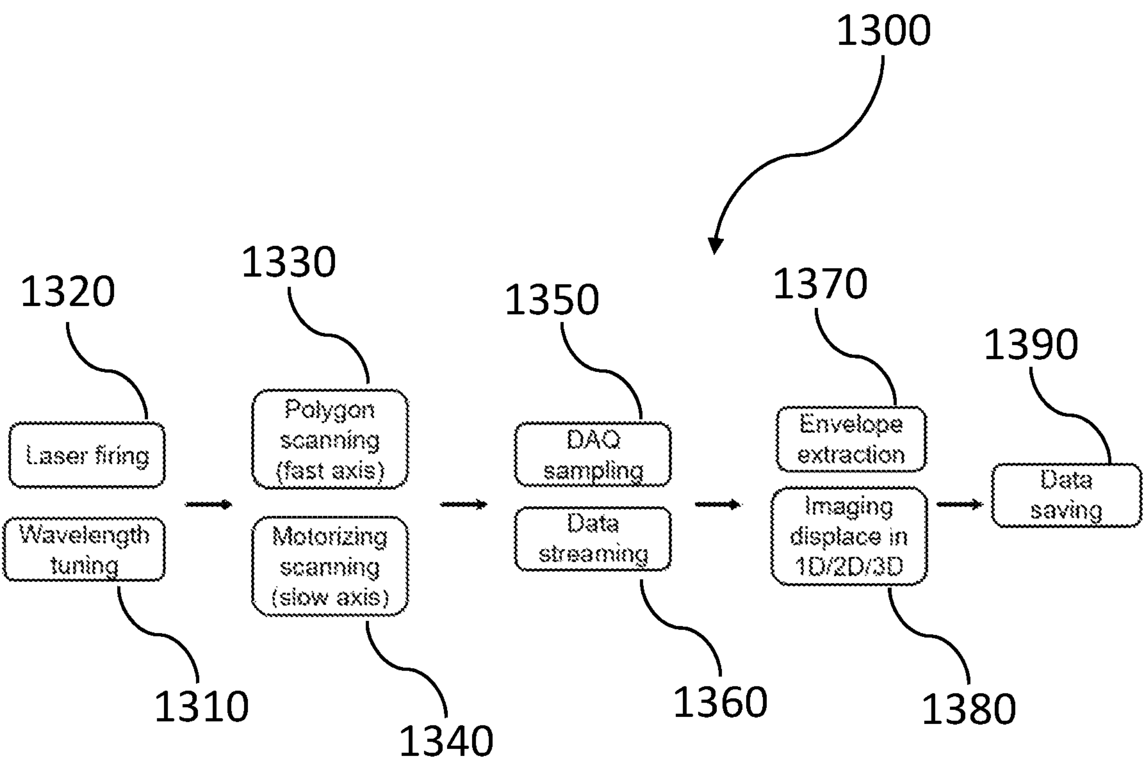
FIG. 18 is a work-flow diagram depicting a method for controlling a PAM system according to some embodiments herein.

FIG. 18 is a work-flow diagram 1300 depicting steps for controlling an improved PAM system according to at least some embodiments of the disclosure herein. Generally, a controller or the like (e.g., as described with respect to FIG. 19 below) can be operated to synchronize one or more of laser firing, polygon scanning, motorized stage motion, and/or data sampling, for instance using an FPGA system (e.g., myRIO, National Instruments). As shown, at step or action 1310, a laser wavelength(s) can be tuned and at step or action 1320, that laser(s) can be fired, for instance by a seed laser(s) as provided for herein. The wavelength tuning action 1310 can occur prior to, in conjunction with, and/or after the laser firing action 1320, with a person skilled in the art being capable of performing tuning at various junctures to provide for desired laser firing. As further shown, at step or action 1330, a polygon scanner, such as those provided for herein, can be operated along the fast axis. Likewise, at step or action 1340, a motor coupled to the polygon scanner, such as those provided for herein, can be operated along a slow axis. These actions 1330 and 1340 can occur simultaneously, at different times, or a combination of the two, with a person skilled in the art being capable of determining which scanning is appropriate at what times in view of the present disclosures and knowledge of the skilled person. Turning to step or action 1350, DAQ sampling can occur. Further, as shown at step or action 1360, data streaming can occur. The actions 1350 and 1360 can occur simultaneously, at different times, or a combination of the two. FIG. 18 illustrates that at step or action 1370, envelope extraction can be performed, and at step or action 1380, image displacement in one dimension, two dimensions, and/or three-dimensions can occur. As in other instances, the actions 1370 and 1380 can occur simultaneously, at different times, or a combination of the two. Still further, at step or action 1390, data saving can occur. To the extent certain steps or actions are not fully described herein, such as the action of envelope extraction, a person skilled in the art, in view of the present disclosures, will understand how to perform such functions and thus a further explanation is unnecessary.

All of the various actions 1310, 1320, 1330, 1340, 1350, 1360, 1370, 1380, and 1390, can be performed at any point in time during the work-flow. That is, although in the illustrated diagram certain steps are shown further downstream than others, over the course of the process being performed, those actions can be occurring simultaneously and/or subsequent to each other. By way of non-limiting example, the DAQ sampling action 1350 and the data streaming action 1360 can occur while the laser firing action 1320 is occurring (with or without the wavelength tuning action 1310 occurring) and/or while the polygon scanning action 1330 and/or the motorizing scanning action 1340 are occurring. Likewise, the envelope extraction action 1370 and/or the imaging displace in 1D/2D/3D action 1380 and/or the data saving action 1390 can also occur at the same time or different times as the previously-numbered actions are occurring. The precise synchronization of each system component (e.g., laser, polygon scanner, motorized stage, data acquisition) has an accuracy of approximately 25 ns as determined by a clock rate of the FPGA system. This high accuracy can be useful to provide accurate localization of the laser light, the acoustic wave, and/or the sample.

The systems and methods described herein can be implemented in hardware, software, firmware, or combinations of hardware, software, and/or firmware. In some examples, the systems and methods described in this specification may be implemented using a non-transitory computer readable medium storing computer executable instructions that when executed by one or more processors of a computer cause the computer to perform operations. Computer readable media suitable for implementing the systems and methods described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application-specific integrated circuits. In addition, a computer readable medium that implements a system or method described in this specification may be located on a single device or computing platform or may be distributed across multiple devices or computing platforms.

Figure 19:
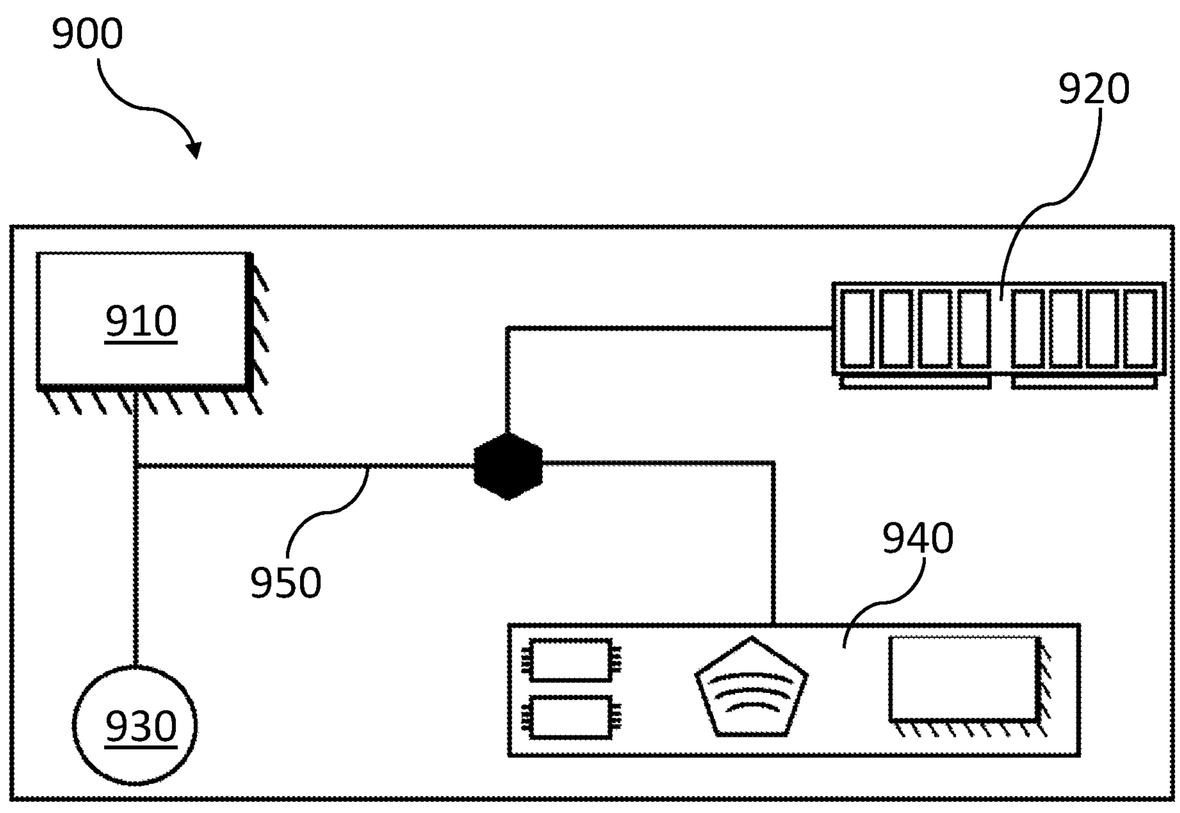
FIG. 19 is a schematic block diagram of one exemplary embodiment of a computer system for use in conjunction with the present disclosures.

By way of non-limiting example, FIG. 19 provides for a computer system 1600 upon which actions provided for in the present disclosure can be built, performed, trained, etc. The system 1600 can include a processor 1610, a memory 1620, a storage device 1630, and an input/output device 1640. Each of the components 1610, 1620, 1630, and 1640 can be interconnected, for example, using a system bus 1650. The processor 1610 can be capable of processing instructions for execution within the system 1600. The processor 1610 can be a single-threaded processor, a multi-threaded processor, or similar device. The processor 1610 can be capable of processing instructions stored in the memory 1620 or on the storage device 1630. The processor 1610 may execute operations, such as synchronizing various components of a PAM system (e.g., the system 100) and/or processing image data, among other features described in conjunction with the present disclosure.

The memory 1620 can store information within the system 1600. In some implementations, the memory 1620 can be a computer-readable medium. The memory 1620 can, for example, be a volatile memory unit or a non-volatile memory unit. In some implementations, the memory 1620 can store information related to image processing, among other information.

The storage device 1630 can be capable of providing mass storage for the PAM system(s). In some implementations, the storage device 1630 can be a non-transitory computer-readable medium. The storage device 1630 can include, for example, a hard disk device, an optical disk device, a solid-date drive, a flash drive, magnetic tape, or some other large capacity storage device. The storage device 1630 may alternatively be a cloud storage device, e.g., a logical storage device including multiple physical storage devices distributed on a network and accessed using a network. In some implementations, the information stored on the memory 1620 can also or instead be stored on the storage device 1630.

The input/output device 1640 can provide input/output operations for the PAM system(s). In some implementations, the input/output device 1640 can include one or more of network interface devices (e.g., an Ethernet card), a serial communication device (e.g., an RS-232 10 port), and/or a wireless interface device (e.g., a short-range wireless communication device, an 802.11 card, a 4G wireless modem, or a 5G wireless modem). In some implementations, the input/output device 1640 can include driver devices configured to receive input data and send output data to other input/output devices, e.g., a keyboard, a printer, and display devices (such as a graphical user interface for the PAM system(s), and/or various components thereof). In some implementations, mobile computing devices, mobile communication devices, and other devices can be used.

In some implementations, the system 1600 can be a microcontroller. A microcontroller is a device that contains multiple elements of a computer system in a single electronics package. For example, the single electronics package could contain the processor 1610, the memory 1620, the storage device 1630, and input/output devices 1640.

Although an example processing system has been described above, implementations of the subject matter and the functional operations described above can be implemented in other types of digital electronic circuitry, or in computer software, firmware, and/or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a processing system. The computer readable medium can be a machine-readable storage device, a machine-readable storage substrate, a memory device, a composition of matter effecting a machine readable propagated signal, or a combination of one or more of them.

Various embodiments of the present disclosure may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

The term "computer system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Such implementation may include a series of computer instructions fixed either on a tangible, non-transitory medium, such as a computer readable medium. The series of computer instructions can embody all or part of the functionality previously described herein with respect to the system. Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. The components of the system can be interconnected by any form or medium of digital data communication, e.g., a communication network. Examples of communication networks include a local area network ("LAN") and a wide area network ("WAN"), e.g., the Internet.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the present disclosure may be implemented as a combination of both software (e.g., a computer program product) and hardware. Still other embodiments of the present disclosure are implemented as entirely hardware, or entirely software.

Overall, the present disclosure provides for an innovative UFF-PAM system that can simultaneously achieve high imaging speed, large field of view, and high spatial resolution. By using Raman-based dual-wavelength exaction and water-immersible polygon-scanner (or other scanners provided for herein), UFF-PAM can capture the hemodynamic changes in the brain or other tissue types. By way of non-limiting example, a 3D frame rate of 2 Hz over an FOV of $11 \times 10 \times 1.5$ $mm^3$ and a lateral resolution of 10 μm was achieved relying upon the present disclosures. The maximum 2D frame rate can be more than 2 kHz over an 11 mm scanning range. In contrast, previous polygon-PAM systems do not operate as quickly and/or are not capable of imaging the tissue functions such as the blood oxygenation level. A person skilled in the art, in view of the present disclosures, will appreciate other techniques may be implemented to further improve image quality or other enhancements. Some techniques may be known to those skilled in the art, while others may need refinement or development in view of the present disclosures. Techniques may include automatic imaging registration method and/or a deep learning-based upsampling approach to help mitigate inter-facet misalignment and the spatial undersampling.

When fast scanning is needed, a rotating polygon mirror can be a useful choice due to its simplicity and high speed. There is no need for an oscillating component or a complex driving system. Unlike the commonly used galvo scanners, which allow flexible control of the beam position, the maximum scanning angle of the polygon scanner can be determined by the number of facets and the incoming beam size. A water-immersed polygon scanner, as provided for herein, can be calibrated for various misalignment between different facets. However, a person skilled in the art, in view of the present disclosures, will appreciate that the need for water immersion can limit the maximum imaging speed and image quality, mostly due to the water's damping force and resistance. Polygon scanners operating in air, as also provided for herein, can be more stable and faster than the water-immersible polygon scanners. Cylindrically focused ultrasound transducers coupled with fast optical scanning can be utilized to mitigate the need for scanning the acoustic beam.

Using UFF-PAM, fast hemodynamic pathophysiology in the mouse brain can be imaged on the global and local level, and oxygen delivery versus extraction/consumption dynamics based on the hemoglobin oxygenation measurement can be investigated. Hypoxia results in view of the present disclosures demonstrate that UFF-PAM can make a unique contribution to the understanding of arterial oxygen content induced changes in cerebral blood flow (CBF) regulation. While the mechanisms underlying the influence of hypoxia upon CBF are complex and involve interactions of many physiological, metabolic, and biochemical processes, there is emerging evidence showing that de-oxy-hemoglobin is the primary regulator of CBF. The present disclosures are able to demonstrate that during hypoxic conditions, arterial and venous $sO_2$ can be affected differently, more pronounced in veins, as OEF increases. Therefore UFF-PAM not only allows global hemoglobin oxygenation kinetics to be observed as other technologies, but also to differentiate between arteries and veins, which reflect oxygen delivery versus oxygen extraction or consumption. Applying the present systems and methods on a well-known hypoxia model, results support the important role of $sO_2$ in the regulation of blood flow.

Still further, the present disclosure allowed for the cerebral response to be investigated, with particular focus on the microcirculation, to critical hypotension induced by the systemic vasodilator SNP. SNP has been widely used in clinical practice as a vasodilator (e.g., during hypertensive crisis), however, studies of SNP effects on the brain vasculature have remained elusive. Although previous studies have reported the brain hemodynamic response to SNP in vivo, and found vasodilation and decreased oxygenation after SNP application, prior to the present disclosures it was believe to not be possible to capture the functional dynamics in different types of vessels, due, at least in part, to the low imaging speed (e.g., 3 minutes per image) and small FOV (e.g., 3×3 $mm^2$). By contrast, UFF-PAM as disclosure here can be capable of visualizing the rapid hemodynamic response to SNP-induced substantial hypotension. Results achieved in view of the present systems and methods have demonstrated the rapid vasodilation in large vessels and yet constriction in microvessels, further underlining the necessity for high resolution imaging of blood oxygenation.

Yet still further, spreading ischemia experiments have demonstrated that prolonged cerebral ischemia can trigger microvascular constriction waves, resulting in increased oxygen extraction. These microvascular constriction waves can follow spreading depolarization events in the brain, which have been proved to contribute to secondary lesion enlargement. The high resolution and large FOV of UFF-PAM as provided for herein allows monitoring the local initiation of the SD, as well as tracking the propagation pattern and vasoconstriction over the entire event across the whole cortex. UFF-PAM may be able to be used for the stroke research community to discern stroke core, penumbra, as well as expansion of the penumbra in real time, and assess neuroprotective therapies in future studies.

More generally, the provided for high-speed wide-field functional PAM systems and methods can provide a powerful tool for studying cerebral hemodynamics of the mouse brain in a wide range of pathological and physiological models, which can likely be carried on to studies in other animals, including humans.

Examples of the above-described embodiments can include the following:

1. A photoacoustic microscopy system comprising:
- a first dichroic reflecting surface;
- a second dichroic reflecting surface;
- a Raman path in optical communication with each of the first and second dichroic reflecting surfaces, the Raman path including:
  - a Raman shifter configured to receive a first portion of a laser from the first dichroic reflecting surface and shift a wavelength of the first portion; and
  - an optical delay line configured to receive a second portion of the laser from the first dichroic reflecting surface and delay the second portion from being received by the second dichroic reflecting surface; and
- a scanner assembly in optical communication with the second dichroic reflecting surface such that it receives both the first portion of the laser and the second portion of the laser from the second dichroic reflecting surface, the scanner assembly including a polygon scanner configured to direct the received first and second portions to a target site.

2. The photoacoustic microscopy system of example 1, further comprising a seed laser, the seed laser being configured to operate at at least about 2 MHz.

3. The photoacoustic microscopy system of example 1 or example 2, further comprising an objective assembly that includes an objective lens.

4. The photoacoustic microscopy system of any of examples 1 to 3, wherein the scanner assembly further comprises an ultrasound transducer.

5. The photoacoustic microscopy system of example 4, wherein the scanner assembly further comprises a multimode optical fiber.

6. The photoacoustic microscopy system of example 4 or example 5, wherein the ultrasound transducer is spherically-focused.

7. The photoacoustic microscopy system of example 4 or example 5, wherein the ultrasound transducer is substantially flat.

8. The photoacoustic microscopy system of any of examples 4 to 7, wherein the ultrasound transducer comprises a piezoelectric layer, a matching layer, and a housing.

9. The photoacoustic microscopy system of any of examples 1 to 8, further comprising:
- a water tank; and
- an optically-transparent ultrasound transducer mounted above the water tank,
- wherein an imaging plane of the photoacoustic microscopy system is disposed within the water tank.

10. The photoacoustic microscopy system of any of examples 1 to 9, wherein the scanner assembly further comprises a cylindrically-focused ultrasound transducer.

11. The photoacoustic microscopy system of any of examples 1 to 10, wherein the scanner assembly is water-immersible.

12. The photoacoustic microscopy system of example 11, wherein the scanner assembly further comprises an optical-acoustic beam combiner, a rhomboid prism, and a right-angled prism.

13. The photoacoustic microscopy system of any of examples 1 to 10, wherein the scanner assembly is air-operated.

14. A photoacoustic microscopy system comprising:
- a Raman path having a Raman shifter configured to receive a first portion of a laser and shift a wavelength of the first portion and an optical delay line configured to receive a second portion of the laser and delay the second portion from being received at a location at which the first portion is received after its wavelength has been shifted; and
- a scanner assembly in optical communication with the Raman path such that the scanner assembly receives the first and second portions of the laser, the scanner assembly including a polygon scanner immersed in fluid.

15. The photoacoustic microscopy system of example 14, wherein the scanner assembly further comprises an acoustic lens.

16. The photoacoustic microscopy system of example 15, wherein the acoustic lens is positioned between an optical-acoustic beam combiner and the polygon scanner.

17. The photoacoustic microscopy system of example 16, further comprising a prism permeable to sound and reflective to light is configured to project the laser through the Raman path.

18. The photoacoustic microscopy system of any of examples 14 to 17, wherein a photoacoustic imaging plane is an arc.

19. A photoacoustic microscopy system comprising:
- a Raman path having a Raman shifter configured to receive a first portion of a laser and shift a wavelength of the first portion and an optical delay line configured to receive a second portion of the laser and delay the second portion from being received at a location at which the first portion is received after its wavelength has been shifted;
- a scanner assembly in optical communication with the Raman path such that the scanner assembly receives the first and second portions of the laser, the scanner assembly including a cylindrically-focused ultrasound transducer and an air-operated polygon scanner, the air-operated polygon scanner being configured to focus an excitation light along a focal line of the cylindrically-focused ultrasound transducer, and the cylindrically-focused ultrasound transducer being mounted within a water tank, between an imaging plane of the photoacoustic microscopy system and the air-operated polygon scanner.

20. The photoacoustic microscopy system of example 19, wherein the imaging plane is substantially flat.

One skilled in the art will appreciate further features and advantages of the present disclosure based on the above-described embodiments. Accordingly, the disclosure is not to be limited by what has been particularly shown and described, except as indicated by the appended claims. Further, a person skilled in the art, in view of the present disclosures, will understand how to implement the disclosed systems and methods provided for herein in conjunction with various imaging technologies and/or technologies that can benefit from photoacoustic imaging. All publications and references cited herein are expressly incorporated herein by reference in their entireties, including Zhu, Xiaoyi, Qiang Huang, Anthony DiSpirito, Tri Vu, Qiangzhou Rong, Xiaorui Peng, Huaxin Sheng et al. "Real-time whole-brain imaging of hemodynamics and oxygenation at micro-vessel resolution with ultrafast wide-field photoacoustic microscopy." *Light: Science & Applications* 11, no. 1 (2022): 1-15.

In the foregoing detailed description, numerous specific details are set forth by way of examples to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present disclosure. While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated. As will be realized, the subject technology is capable of other and different configurations, several details are capable of modification in various respects, embodiments may be combined, steps in the flow charts may be omitted or performed in a different order, all without departing from the scope of the subject technology. Accordingly, the drawings, flow charts, and detailed description are to be regarded as illustrative in nature and not as restrictive.

What is claimed is:

1. A photoacoustic microscopy system comprising:

a first dichroic reflecting surface;

a second dichroic reflecting surface;

a Raman path in optical communication with each of the first and second dichroic reflecting surfaces, the Raman path including:

a Raman shifter configured to receive a first portion of a laser from the first dichroic reflecting surface and shift a wavelength of the first portion; and an optical delay line configured to receive a second portion of the laser from the first dichroic reflecting surface and delay the second portion from being received by the second dichroic reflecting surface; and a scanner assembly in optical communication with the second dichroic reflecting surface such that it receives both the first portion of the laser and the second portion of the laser from the second dichroic reflecting surface, the scanner assembly including a polygon scanner configured to direct the received first and second portions to a target site.

2. The photoacoustic microscopy system of claim 1, further comprising a seed laser, the seed laser being configured to operate at at least about 2 MHz.

3. The photoacoustic microscopy system of claim 1, further comprising an objective assembly that includes an objective lens.

4. The photoacoustic microscopy system of claim 1, wherein the scanner assembly further comprises an ultrasound transducer.

5. The photoacoustic microscopy system of claim 4, wherein the scanner assembly further comprises a multimode optical fiber.

6. The photoacoustic microscopy system of claim 4, wherein the ultrasound transducer is spherically-focused.

7. The photoacoustic microscopy system of claim 4, wherein the ultrasound transducer is substantially flat.

8. The photoacoustic microscopy system of claim 4, wherein the ultrasound transducer comprises a piezoelectric layer, a matching layer, and a housing.

9. The photoacoustic microscopy system of claim 1, further comprising:

a water tank; and an optically-transparent ultrasound transducer mounted above the water tank, wherein an imaging plane of the photoacoustic microscopy system is disposed within the water tank.

10. The photoacoustic microscopy system of claim 1, wherein the scanner assembly further comprises a cylindrically-focused ultrasound transducer.

11. The photoacoustic microscopy system of claim 1, wherein the scanner assembly is water-immersible.

12. The photoacoustic microscopy system of claim 11, wherein the scanner assembly further comprises an optical-acoustic beam combiner, a rhomboid prism, and a right-angled prism.

13. The photoacoustic microscopy system of claim 1, wherein the scanner assembly is air-operated.

14. A photoacoustic microscopy system comprising:

a Raman path having a Raman shifter configured to receive a first portion of a laser and shift a wavelength of the first portion and an optical delay line configured to receive a second portion of the laser and delay the second portion from being received at a location at which the first portion is received after its wavelength has been shifted;

a scanner assembly in optical communication with the Raman path such that the scanner assembly receives the first and second portions of the laser, the scanner assembly including a polygon scanner immersed in fluid.

15. The photoacoustic microscopy system of claim 14, wherein the scanner assembly further comprises an acoustic lens.

16. The photoacoustic microscopy system of claim 15, wherein the acoustic lens is positioned between an optical-acoustic beam combiner and the polygon scanner.

17. The photoacoustic microscopy system of claim 16, further comprising a prism permeable to sound and reflective to light is configured to project the laser through the Raman path.

18. The photoacoustic microscopy system of claim 14, wherein a photoacoustic imaging plane is an arc.

19. A photoacoustic microscopy system comprising:

a Raman path having a Raman shifter configured to receive a first portion of a laser and shift a wavelength of the first portion and an optical delay line configured to receive a second portion of the laser and delay the second portion from being received at a location at which the first portion is received after its wavelength has been shifted;

a scanner assembly in optical communication with the Raman path such that the scanner assembly receives the first and second portions of the laser, the scanner assembly including a cylindrically-focused ultrasound transducer and an air-operated polygon scanner, the air-operated polygon scanner being configured to focus an excitation light along a focal line of the cylindrically-focused ultrasound transducer, and the cylindrically-focused ultrasound transducer being mounted within a water tank, between an imaging plane of the photoacoustic microscopy system and the air-operated polygon scanner.

20. The photoacoustic microscopy system of claim 19, wherein the imaging plane is substantially flat.

* * * * *